(12) United States Patent
Michels et al.

(10) Patent No.: US 6,226,321 B1
(45) Date of Patent: May 1, 2001

(54) MULTICHANNEL PARAMETRIC ADAPTIVE MATCHED FILTER RECEIVER

(75) Inventors: James H. Michels, Clinton, NY (US); Muralidhar Rangaswamy, Marlborough, MA (US); Jaime R. Román, Palm Beach Gardens; Dennis W. Davis, Eustis, both of FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/074,821

(22) Filed: May 8, 1998

(51) Int. Cl.$^7$ .............................. H04B 3/46; H03D 1/00; H03D 1/04
(52) U.S. Cl. .......................... 375/227; 375/340; 375/346
(58) Field of Search .................... 375/227, 229, 375/340, 285, 346, 260, 267; 370/347, 319

(56) References Cited

U.S. PATENT DOCUMENTS 4,855,932 * 8/1989 Cangiani et al. ...................... 342/77
5,168,215 * 12/1992 Puzzo ................................. 324/76.44
5,272,698 * 12/1993 Champion ............................ 370/260
5,640,429 * 6/1997 Michels et al. ...................... 375/340

* cited by examiner

Primary Examiner—Chi H. Pham
Assistant Examiner—Khai Tran
(74) Attorney, Agent, or Firm—Harold L. Burstyn

(57) ABSTRACT

Apparatus and method for improving the detection of signals obscured by either correlated Gaussian or non-Gaussian noise plus additive white Gaussian noise using Estimates from multi-channel data of model parameters that describe the noise disturbance correlation are obtained from data that contain signal-free data vectors, referred to as "secondary" or "reference" cell data. These parameters form the coefficients of a multi-channel whitening filter. A data vector to be tested for the presence of a signal passes through the multi-channel whitening filter. The filter's output is then processed to form a test statistic. The test statistic is compared to a threshold value to decide whether a signal is "present" or "absent". Embodiments of the apparatus and method include estimating the signal amplitude both implicitly and explicitly and calculating test statistics for signal detection in both Gaussian and non-Gaussian noise.

27 Claims, 16 Drawing Sheets

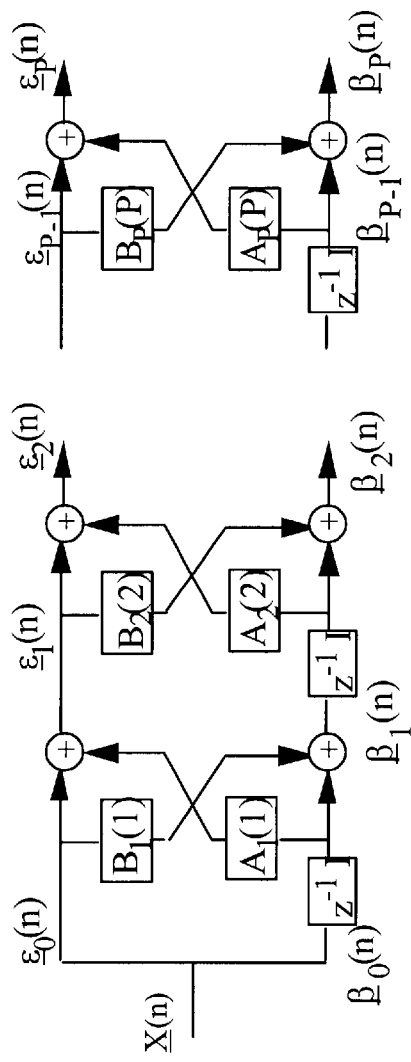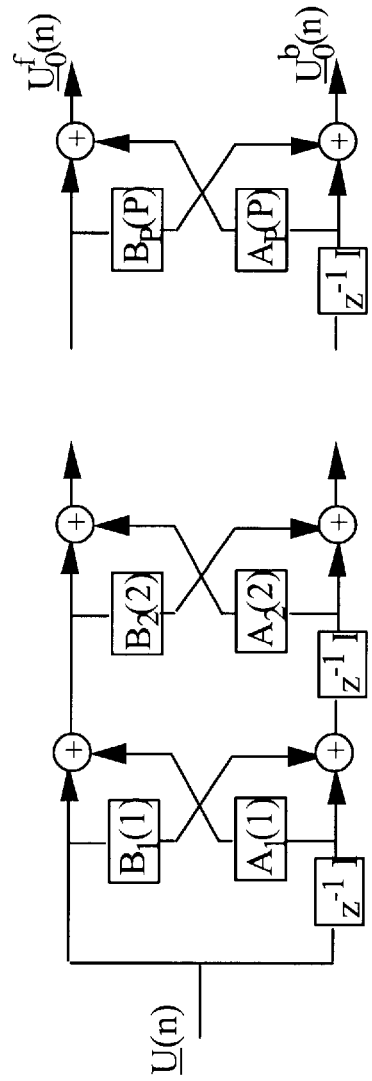
Figure 5A
PRIOR ART
Figure 5B
PRIOR ART

MULTICHANNEL PARAMETRIC ADAPTIVE MATCHED FILTER RECEIVER

STATEMENT OF GOVERNMENT INTEREST

The invention described herein may be manufactured and used by or for the Government for governmental purposes without the payment of any royalty thereon.

BACKGROUND OF THE INVENTION

The present invention relates to improving the detection performance of multi-channel receivers, and, in particular, to improving the detection of signals masked by the presence of partially correlated Gaussian or non-Gaussian noise plus additive Gaussian thermal white noise. The apparatus and method of the present invention is directed to the signal processing architecture and computational procedures of multi-channel receivers. The present invention has radar, sonar, geophysical, and biomedical applications.

BACKGROUND—DESCRIPTION OF THE PRIOR ART

The use of multi-channel signal processing methods to detect the presence of a desired signal is well established. Basing such methods on parametric models offers the prospect of improved performance over the prior art.

In airborne array radar applications, for example, with J antenna elements (spatial channels) and N pulses per coherent processing interval ("CPI"), optimal signal detection methods using both angle- and Doppler-processing require joint space-time matched filtering in the JN×JN complex vector space. Such techniques are generally computationally prohibitive, and they require large amounts of secondary data (i.e., data from the radar surveillance region assumed to be free of the target signal of interest) to estimate the noise disturbance correlation. In addition, for conditions of non-homogeneous clutter, the secondary data may lack statistical equivalence to that in the range cell under test. Also, for the conventional Gaussian receiver, distinct thresholds must be established for individual range-azimuth cells over the entire radar surveillance volume. This requirement follows from the observation that the data sequence of N pulses is Gaussian for each individual range cell but non-Gaussian from cell to cell.

The performance of Gaussian receivers is improved to a degree by the systems described in the following U.S. patents:

U.S. Pat. No. 5,640,429 issued to Michels and Rangaswamy:

U.S. Pat. No. 5,272,698 issued to Champion;

U.S. Pat. No. 5,168,215 issued to Puzzo, and

U.S. Pat. No. 4,855,932 issued to Cangiani.

Cangiani et al. discloses a three dimensional electro-optical tracker with a Kalman filter in which the target is modeled in space as the superposition of two Gaussian ellipsoids projected onto an image plane. Puzzo offers a similar disclosure. Champion discloses a digital communication system.

Michels et al., hereby incorporated by reference, discloses two implementations, for a signal that has respectively a known and an unknown amplitude. For the signal of unknown amplitude, Michels et al. does not teach how to incorporate the estimated signal amplitude directly into the parametric detection procedure. Rather, Michels et al. teaches first estimating the covariance matrix of the disturbance from the secondary data cells and then obtaining a maximum likelihood estimate of the signal amplitude. This procedure requires a larger number of secondary data cells to achieve acceptable performance than does the present invention.

Thus there exists a need for apparatus and method of embedding the signal amplitude estimate directly into the parametric detection test statistic using a significantly smaller number of secondary data cells than the prior art.

OBJECTS AND SUMMARY OF THE INVENTION

Therefore one object of the present invention is to provide apparatus and method of detecting desired signals in additive Gaussian or non-Gaussian disturbance processes using single-channel or multiple-channel sensors.

Another object of the present invention is to provide apparatus and method of detecting desired signals in additive Gaussian or non-Gaussian disturbance processes that use efficiently the available data from secondary data cells; i.e., require only a small number of secondary data cells.

Still another object of the present invention is to provide apparatus and method of detecting desired signals in additive Gaussian or non-Gaussian disturbance processes that uses linear prediction error filters.

Briefly stated, the present invention provides apparatus and method for improving the detection of signals obscured by either correlated Gaussian or non-Gaussian noise plus additive jamming interference and thermal white Gaussian noise. Estimates from multi-channel data of model parameters that describe the noise disturbance correlation are obtained from data that contain signal-free data vectors, referred to as "secondary" or "reference" cell data. These parameters form the coefficients of a multi-channel whitening filter. A data vector, referred to as the "test cell" or "primary" data vector, to be tested for the presence of a signal passes through the multi-channel whitening filter. The filter's output is then processed to form a test statistic. The test statistic is compared to a threshold value to decide whether a signal is "present" or "absent". Embodiments of the apparatus and method include estimating the signal amplitude both implicitly and explicitly and calculating test statistics for signal detection in both Gaussian and non-Gaussian noise.

According to an embodiment of the invention, in a system for processing signals, a method for identifying presence or absence of at least one potential target comprises the steps of: receiving from multiple channels signals corrupted by Gaussian or non-Gaussian disturbance; partitioning the signals into secondary data having a low probability of containing the potential target and primary data to be assessed for the presence of the target; estimating at least one linear filter parameter from the secondary data; filtering at least one steering vector and the primary data with at least one whitening filter based on the at least one linear filter parameter to produce at least one steering vector residual and at least one primary data residual; calculating a first test statistic as a function of the at least one linear filter parameter, the at least one steering vector residual, and the at least one primary data residual; and comparing the first test statistic to a threshold value to provide a "target present" or a "target absent" response when the signals are corrupted by Gaussian disturbance.

According to a feature of the invention, in a system for processing signals, a method for identifying presence or absence of at least one potential target comprises the steps of: receiving from multiple channels signals corrupted by Gaussian or non-Gaussian disturbance; partitioning the signals into secondary data having a low probability of containing the potential target and primary data to be assessed for the presence of the target; estimating at least one linear filter parameter from the secondary data; filtering at least one steering vector and the primary data with at least one whitening filter based on the at least one linear filter parameter to produce at least one steering vector residual and at least one primary data residual; estimating signal amplitude as a function of the at least one linear filter parameter, the at least one steering vector residual, and the at least one primary data residual, thereby obtaining an estimated signal amplitude; multiplying the at least one steering vector residual by the estimated signal amplitude to obtain a scaled steering vector residual; subtracting the scaled steering vector residual from the at least one primary data residual to create an intermediate result; calculating a first quadratic term as a function of the at least one primary data residual and the at least one linear filter parameter; calculating a second quadratic term as a function of the intermediate result and the at least one linear filter parameter; subtracting the second quadratic term from the first quadratic term to form a first test statistic; and comparing the first test statistic to a threshold value to provide a "target present" or a "target absent" response when the signals are corrupted by Gaussian disturbance.

According to another feature of the invention, apparatus for processing signals from which to identify presence or absence of at least one potential target, comprises: means for receiving multi-channel signals containing the at least one potential target obscured by Gaussian or non-Gaussian disturbance; means for partitioning the signals into secondary data having a low probability of containing the potential target and primary data to be assessed for the presence of the potential target; means for estimating at least one linear filter parameter from the secondary data; means for filtering at least one steering vector and the primary data with at least one whitening filter based on the at least one linear filter parameter to produce at least one steering vector residual and one primary data residual; first calculating means for calculating a first test statistic as a function of the at least one linear filter parameter, the steering vector residual, and the primary data residual; and means for comparing effective for comparing the first test statistic to a threshold value to provide a "target present" or a "target absent" response when the signals are corrupted by Gaussian disturbance.

According to still another feature of the invention, apparatus for processing signals from which to identify presence or absence of at least one potential target, comprises: means for receiving multi-channel signals containing the potential target obscured by Gaussian or non-Gaussian disturbance; means for partitioning the signals into secondary data having a low probability of containing the potential target and primary data to be assessed for the presence of the potential target; means for estimating at least one linear filter parameter from the secondary data; means for filtering at least one steering vector and the primary data with at least one whitening filter based on the at least one linear filter parameter to produce at least one steering vector residual and one primary data residual; first calculating means for calculating an estimate of signal amplitude as a function of the at least one linear filter parameter, the steering vector residual, and the primary data residual; means for multiplying the filtered steering vector residual by the estimate of signal amplitude to create a scaled steering vector residual; first subtracting means for subtracting the scaled steering vector residual from the primary data residual to create an intermediate result; second calculating means for calculating a first quadratic term as a function of the primary data residual and the at least one linear filter parameter; third calculating means for calculating a second quadratic term as a function of the intermediate result and the at least one linear filter parameter; second subtracting means for subtracting the second quadratic term from the first quadratic term to form a first test statistic; and means for comparing the first test statistic to a threshold value to provide a "target present" or a "target absent" response when the signals are corrupted by Gaussian disturbance.

The apparatus and method of the present invention provide a multi-channel receiver that improves the detection of target signals in the presence of either Gaussian or non-Gaussian correlated clutter together with additive jamming interference and thermal white noise. The present invention improves detection for radar, sonar, biomedical diagnostics, geophysical data processing, etc., where the input data contain either Gaussian or non-Gaussian disturbance. This improvement is achieved through the signal processing architecture and computational procedure described below.

Several important features of the present invention are: (1) it can process both single and multiple channel data; (2) the implementation described below applies to the detection of a signal with unknown amplitude embedded in disturbances of unknown correlation; (3) the detection architecture is canonical for non-Gaussian clutter described by spherically invariant random processes ("SIRPs") (Rangaswamy, M., et. al., "Computer generation of correlated non-Gaussian radar clutter," IEEE Trans. on Aerospace and Electronic Systems, vol. AES-31, pp. 106–116, 1995), i.e., the circuitry does not change when the statistics of the input data processes change; (4) the minimum mean squared error (MMSE) parameter estimators in the present invention are linear for the large class of non-Gaussian SIRPs that comprise the disturbance; (5) the implementation described below for the K ($\alpha=0.5$)-receiver offers robust performance for a wide range of non-Gaussian as well as Gaussian noise, where $\alpha$ is the shape parameter of the clutter probability density function ("pdf").

In the present invention, the unknown disturbance correlation is estimated from secondary data by means of parametric adaptive estimation algorithms. However, the estimate of signal amplitude is now embedded directly into the detection test statistic. Thus a large covariance matrix requiring approximately 2 JN range cells is no longer required, with the result that high detection performance can be achieved with a very low number of range cells.

In a preferred embodiment of the present invention for the detection of moving objects from an airborne radar, the processing system uses baseband sensor data from the A/D converters of an airborne phased array radar. This sensor data is organized as a J×1 vector sequence, where each element of the vector corresponds to a particular array element (or column), and each index in the sequence corresponds to a time sample that relates to a specific transmitted pulse of the N pulse coherent processing interval ("CPI"). A third dimension of the data is obtained from the K range rings measured from the radar. These range rings are swept by each pulse, thus providing K with J×1 observation data vectors in fast time for each of the N pulses in slow time. Thus, the data can be stacked in a data cube of dimension J×N×K.

To determine the presence or absence of a target, data are chosen from a specific range cell, the "test cell". Data from range cells immediately surrounding the test cell are "guard band" cell data. Several procedures can determine the disturbance's (e.g., ground clutter, jamming interference, thermal white noise) correlation properties. In one procedure, both the test cell and guard band data are removed from the data cube, leaving the "secondary" or "reference" cell vectors, which are assumed to be signal free. In an alternative procedure, no vectors are removed from the data cube.

Linear parametric models ("LPMs") describe the noise disturbance correlation. There are two general classes of such models for vector random processes: time series and state space. Either kind of LPMs falls within the intended scope of the present invention. Any of several multi-channel algorithms can estimate the parameters of the respective model types. Nuttall-Strand (Nuttall, A. H., "Multivariate linear predictive spectral analysis employing weighted forward and backward averaging: A generalization of Burg's algorithm," Naval Underwater Systems Center TR-5501, New London, Conn. October 1976; Strand, O. N., "Multi-channel complex maximum entropy (auto-regressive) spectral analysis," IEEE Trans. Antom. Control, vol, AC-22, pg 634–640, August 1977) and Vierra-Morf (Morf, M., Vierra, A., Lee, D., Kailath, T., "Recursive Multi-channel maximum entropy spectral estimation," IEEE Trans. on Geoscience Electronic, vol GE-16, no 2, April 1978) algorithms apply to time series models. A number of recently-developed multi-channel state space algorithms (Roman, J., Davis, D., "Multi-channel Parametric Models for Airborne Radar Array Clutter," 1997 IEEE National Radar Conference, Syracuse, N.Y., May 13–15, 1997) apply to state space models. The model parameters estimated from any candidate algorithm form the coefficients in a multi-channel whitening filter. Both the data vector from the test cell and the known steering vector written in time sequential form are passed through this filter. The output vectors from the multi-channel whitening filter are then processed to form a scalar "test statistic." The "test statistic" is then compared to a threshold value to decide whether a signal is present or absent.

The following definitions serve to clarify the present invention:

A/D Converter: a device that converts analog signals to digital signals.

Adaptive Matched Filter: a matched filter detector in which the disturbance covariance matrix is replaced with its estimate.

Coefficients of Linear Prediction: the coefficients that weight a linear combination of time series of past data from a given process to estimate the process at some point in time.

Coherent Processing Interval (CPI): the number of pulses generated by a radar in an interval of time over which the radar maintains phase coherence.

Constant False Alarm Rate (CFAR): attribute of a receiver that maintains the false alarm rate fixed in the presence of changing interference levels.

Data Cube: the organization of data consisting of various channels, range cells, and pulses into a three-dimensional configuration for storage.

Diagonal Matrix: a matrix with whose elements are non-zero only along the diagonal.

Diagonal Matrix Coefficient (D): obtained from the LDL decomposition of either the model residual covariance matrix or the sample residual covariance matrix estimates.

Disturbance: all unwanted noise that interferes with the desired signal.

False Alarm: the decision that a signal is present when in fact it is not.

Fast Time: the round-trip time delay, as measured between range cells, of a single radar pulse (which travels at the speed of light).

Guard Band: the data, collected from range rings adjacent to the test cell, which are eliminated from the secondary data cells before estimating the disturbance statistics.

Host System: the system supported by the present invention.

Input Signal-to-Interference plus Noise Ratio: the ratio of the filter input signal power to the input power of the interference and white noise.

Linear Filter Parameters: the estimated coefficients of linear prediction used in the whitening filter of the parametric adaptive matched filter.

Matched Filter: in the context of this application, a linear filter that maximizes the output signal-to-interference-plus-noise ratio.

Model Residual Covariance: the estimated error covariance matrix obtained from a parameter estimation algorithm such as Nuttall-Strand.

Output Signal-to-Interference plus Noise Ratio: the ratio of the filter output signal power to the output power of the interference and white noise.

Prediction Error Filter: a filter that provides the difference operation between the input signal and its estimate formed by the weighted sum of past data values.

Range Rings: the concentric lines of constant range measured from the radar location, each with a width related to the radar bandwidth.

Reference Cell Data: data collected from range rings assumed to be free of the desired signal (also called secondary data).

Sample Covariance Matrix: the estimator of the covariance of a data vector process obtained from the mean of the outer products of the multiple realizations of the data vector.

Sample Residual Covariance: the estimated error covariance matrix obtained by applying the sample covariance matrix estimator to the prediction error filter output data.

Secondary Data: data collected from range rings assumed to be free of the desired signal.

Slow Time: the interval between successive pulses from the radar.

Spherically Invariant Random Process: results from the modulation of a Gaussian process by a statistically independent random variable.

Signal Steering Vector: contains the bearing and Doppler information associated with a radar signal.

Test Cell Data: contained in the radar range cell under test for the presence or absence of a radar signal.

Test Statistic: a scalar quantity, computed from received radar data and compared to a pre-determined threshold value to determine the presence or absence of a radar signal.

Threshold: a scalar quantity compared to a test statistic to determine the presence or absence of a desired signal and chosen to maintain a specific criterion, such as the cost associated with correct and incorrect decisions or the specification of the probability of a false alarm.

Time Sequential Form: in the context of the present invention, the formatting of a signal or data vector as a time series.

Whitening Filter: transforms the correlated input data to uncorrelated white noise.

Zero Memory Non-linear Transform: method of transforming blocks of data to maintain dependence between the individual blocks.

The above and many other objects and advantages of the present invention will be readily apparent to one skilled in the pertinent art from the following detailed description of preferred embodiments of the invention and the related drawings, in which like reference numerals designate the same elements.

BRIEF DESCRIPTION OF THE DRAWINGS

FIG. 5A shows a multi-channel lattice linear prediction error filter with J×J matrix coefficients (J channels) processing the observation data vector of FIG. 4A.

FIG. 5B shows the filter of FIG. 5A rotating the known signal steering vector of FIG. 4B.

DESCRIPTION OF THE PREFERRED EMBODIMENTS

Figure 1:
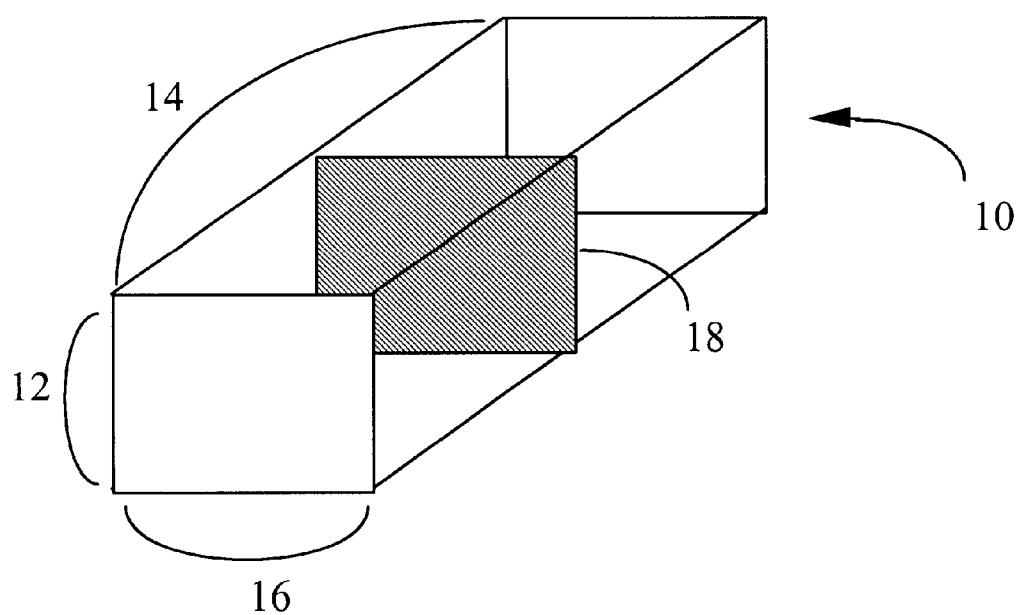
FIG. 1 shows a Data Cube from which secondary and primary data are obtained in an airborne radar application.

Referring to FIG. 1, a data cube 10 depicts a three-dimensional storage configuration for the organization of data over N pulses 16, J channels 12, and K range cells 14. Data cube 10 is divided into three regions. A first region is a test cell 18 containing 'primary data'. Test cell 18 is the range ring under test for the presence or absence of a desired signal. A second region is reference cells or range rings containing 'secondary data' assumed to be free of the desired signal. Thus the second region contains only the disturbance. A third region contains 'guard cells', located on both sides of test cell 18, that isolate test cell 18 from the reference cells. This third region prevents leakage of the signals into the secondary data.

Figure 2:
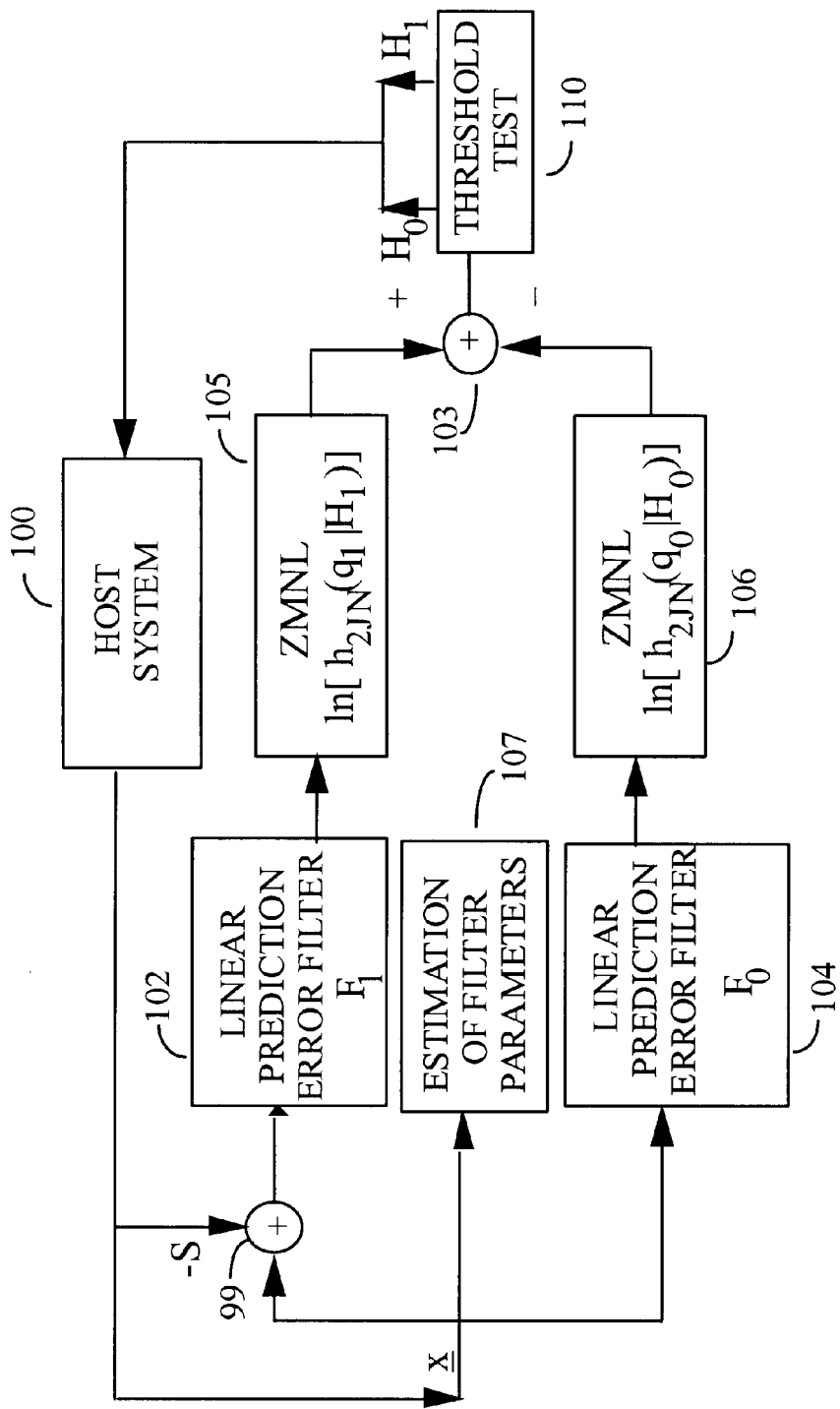
FIG. 2 shows a prior-art non-Gaussian apparatus and method for the case of a desired signal with known amplitude.
Figure 3:
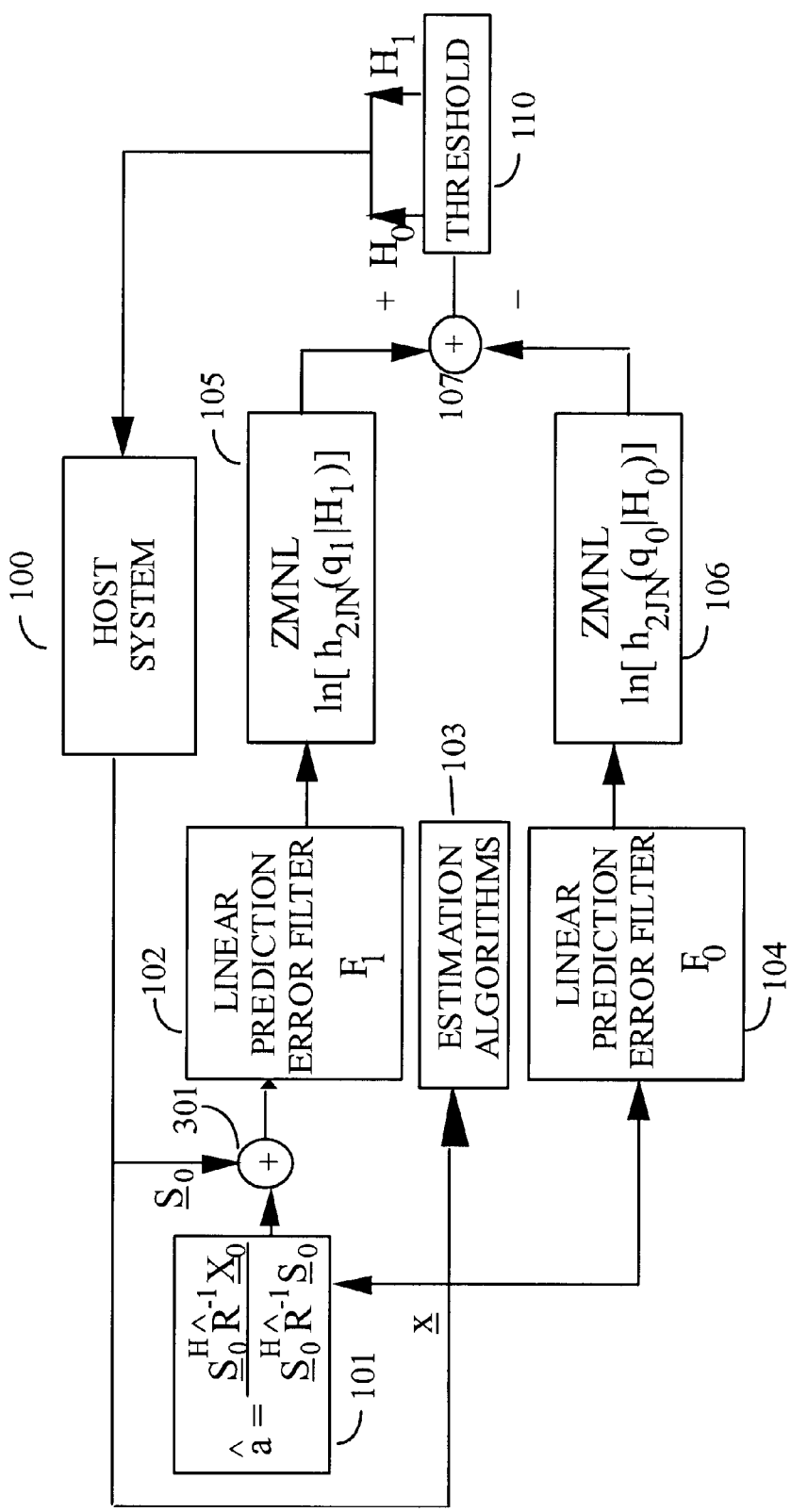
FIG. 3 shows a prior-art non-Gaussian apparatus and method for the case of a desired signal with unknown amplitude.

Referring to FIGS. 2 and 3, U.S. Pat. No. 5,640,429 to Michels et al. teaches detection architecture for a signal whose amplitude is known (FIG. 2) or unknown (FIG. 3). The estimation of the unknown amplitude, however, is not directly incorporated into the detection procedure. Rather, an estimate of the signal amplitude is first obtained (block 101 of FIG. 3), where R is the estimate of the disturbance covariance matrix. This estimate is obtained by first forming a J N×J N covariance matrix at each range ring from the observed J N×1 data vector (containing J channels and N pulses) and then averaging these estimates over the secondary data range cells. Specifically, $$\hat{R} = \frac{1}{K}\sum_{k=1}^{K} X_k X_k^H$$

where H is the Hermitian transpose operation and $X_k$ is the secondary data vector for the kth range cell. Since $\hat{R}$ is a J N×J N matrix, it requires a secondary data sample support size greater than J N to prevent ill-conditioning. This estimate of signal amplitude requires a much larger number of secondary data cells for acceptable performance than does the present invention.

In the present invention, the unknown disturbance correlation is again estimated from the secondary data by means of parametric adaptive estimation algorithms. However, the signal amplitude estimate is now embedded directly into the detection test statistic. Thus the large covariance matrix estimate that requires approximately 2 J N range cells is no longer necessary. The result is that high detection performance can be achieved with a very low number of range cells.

In the discussion that follows, we choose an autoregressive ("AR") time series model as representative of an LPM implementation. (Another time series model or a state space model can be used instead.). For clarification, we review the related subject of linear prediction, which is well known in the prior art.

Linear Prediction

To understand the present invention, we offer a brief description of linear prediction as applied to the present invention. Consider the J×1 data vector $x_k(n)$ from the kth range ring at time n. We define the order M, zero mean, linear prediction estimate $\hat{x}_k(n|n-1)$ of $x_k(n)$ from past values of $x_k(n)$ as $$\hat{x}(n|n-1) = -\sum_{m=1}^{M} A_{M,k}^H(m)\underline{x}_k(n-m).$$

The corresponding prediction error is therefore, $$\epsilon_k(n) = x_k(n) - \hat{x}_k(n|n-1).$$

Thus $\epsilon_k(n)$ can be expressed as the output of a multi-channel prediction error filter of order P expressed as $$\varepsilon_k(n) = \sum_{p=0}^{P} A_{P,k}^H(p)x(n-p),$$

where $A_{P,k}(p)$ is a J×J matrix coefficient, A(0)=I is the J×J identity matrix, and x(n) is the input data process. The coefficients $A_{P,k}(p)$ are chosen to minimize the mean-square error $E[|\epsilon_k(n)|^2]$ of $\epsilon_k(n)$. In this case, $\epsilon_k(n)$ is an error residual that is whitened in time (and partially across channels). The remaining cross-channel correlation is expressed by the kth range cell prediction error covariance matrix $\Sigma_{\epsilon,k}$, expressed as $$\Sigma_{\epsilon,k} = E[\epsilon_k(n)\epsilon_k^H(n)].$$

The diagonalization of $\Sigma_{\epsilon,k}$ will further decorrelate $\epsilon_k(n)$ across channels. This diagonalization can be carried out by any of several Hermitian matrix factorizations. Foremost among them are Cholesky factorization, LDU decomposition, and singular value decomposition ("SVD").

The Cholesky factorization of $\Sigma_{\epsilon,k}$ is defined as $$\Sigma_{\epsilon,k} = CC^H,$$

where C is a J×J complex-valued, lower triangular matrix with non-zero elements along the diagonal. This factorization requires $\Sigma_{\epsilon,k}$ to be non-singular.

The LDU decomposition of $\Sigma_{\epsilon,k}$ is defined as $$\Sigma_{\epsilon,k} = LDL^H$$

where L is a J×J complex-valued, lower triangular matrix with unity-valued elements along the main diagonal, and D is a J×J diagonal matrix with real-valued, non-negative diagonal entries. In this factorization, $\Sigma_{\epsilon,k}$ can be rank-deficient, and the deficiency is manifested with a corresponding number of zeros along the main diagonal of D.

The SVD of $\Sigma_{\epsilon,k}$ is defined as $$\Sigma_{\epsilon,k} = USV^H$$

Hence the following error residuals are whitened both in time and across channels by one of the respective multiplying factors:

$$\Gamma_C(n) = C_k^{-1}\epsilon_k(n)$$

$$\Gamma_L(n) = L_k^{-1}\epsilon_k(n)$$

$$\Gamma_U(n) = U_k^{-1}\epsilon_k(n)$$

Figure 4A:
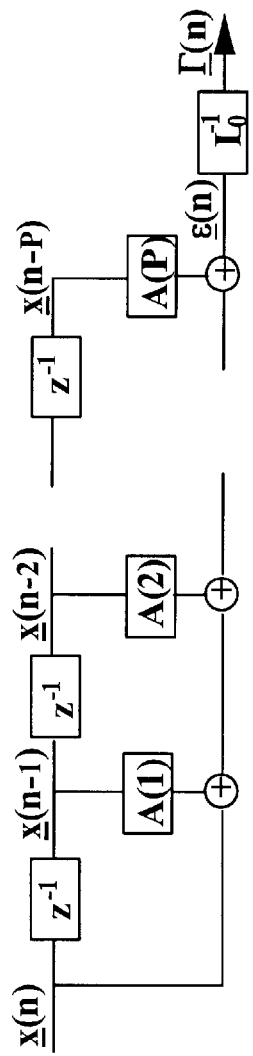
FIG. 4A shows a multi-channel tapped delay line linear prediction error filter with J×J matrix coefficients (J channels) processing an observation data vector.

We call the factors $C_k^{-1}$, $L_k^{-1}$, and $U_k^{-1}$ spatial whitening coefficients. The selection of which coefficient to apply in a given physical environment depends on the rank deficiency of the error covariance matrix $\Sigma_{\epsilon,k}$ and other numerical issues. In a preferred embodiment of the present invention, we apply the LDU-based $L_k^{-1}$ coefficient because it can be interpreted as an optimal spatial filter. A whitening filter for the AR time series model of the disturbance that incorporates this spatial whitening is shown in FIG. 4A.

Similarly, linear prediction can be defined to operate on the time series in the backward direction to make a prediction of the sample $x_k(n-m)$ as $$\hat{x}_k(n-M|U_n) = -\sum_{m=1}^{M} B_{M,k}^H(m)\underline{x}_k(n-m+1),$$

where $U_n$ denotes the space spanned by $x_k(n)$, $x_k(n-1)$, ..., $x_k(n-m+1)$ and $B_{M,k}^H(m)$, m=1, 2, ..., M denotes the order M, J×J backward coefficients of linear prediction.

Multi-channel Linear Prediction Algorithms

As noted above, several multi-channel time series algorithms are available in the prior art. The Nuttall-Strand algorithm is summarized here as an example of an identification algorithm for a time-series LPM that estimates the multi-channel autoregressive ("AR") coefficients of the multi-channel tapped delay line and lattice prediction error filters.

a.) Initialization $$\epsilon_0(n) = \beta_0(n) = x(n)$$

$$\Sigma_0^f = \Sigma_0^b = \frac{1}{N}\sum_{n=1}^{N} \underline{x}(n)\underline{x}^H(n)$$

Update the estimated Error Covariance Matrices:

$$\hat{\Sigma}_p^f = \frac{1}{N}\sum_{n=p+2}^{N} \underline{\varepsilon}_p(n)\underline{\varepsilon}_p^H(n-1)$$

$$\hat{\Sigma}_p^b = \frac{1}{N}\sum_{n=p+2}^{N} \underline{\beta}_p(n-1)\underline{\beta}_p^H(n-1)$$

$$\hat{\Sigma}_p^{fb} = \frac{1}{N}\sum_{n=p+2}^{N} \underline{\varepsilon}_p(n)\underline{\beta}_p^H(n-1)$$

where the quantity $\beta_p(n)$ denotes the backward prediction error for the pth order filter. Compute the Estimated Partial Correlation Matrix $\hat{\Delta}_{p+1}$:

$$(\hat{\Sigma}_p^f)(\Sigma_p^f)\hat{\Delta}_{p+1} + \hat{\Delta}_{p+1}(\Sigma_p^b)^{-1}(\hat{\Sigma}_p^b) = -2(\hat{\Sigma}_p^{fb})$$

Update the Forward and Backward Reflection Coefficients:

$$A_{p+1}[p+1] = -\hat{\Delta}_{p+1}(\Sigma_p^b)^{-1}$$

$$B_{p+1}[p+1] = -\hat{\Psi}_{p+1}(\Sigma_p^f)^{-1}$$

$$\hat{\Psi}_{p+1} = \hat{\Delta}_{p+1}^H$$

Update the Forward and Backward Error Covariance Matrices:

$$\Sigma_{p+1}^f = \Sigma_p^f + A_{p+1}[p+1]\hat{\Psi}_{p+1}$$

$$\Sigma_{p+1}^b = \Sigma_p^b + B_{p+1}[p+1]\hat{\Delta}_{p+1}$$

Update the Forward and Backward Prediction Errors:

$$\epsilon_{p+1}(n) = \epsilon_p(n) + A_{p+1}[p+1]\beta_p(n-1)$$

$$\beta_{p+1}(n) = \beta_p(n-1) + B_{p+1}[p+1]\epsilon_p(n)$$

This procedure is repeated until the specified order P is reached. We define the final Pth order forward and backward AR coefficients as $\hat{A}_P^H(m)$ and $\hat{B}_P^H(m)$ for m=1, 2, ..., P, respectively and the forward and backward prediction error parameters as $\hat{\Sigma}_P^f$ and $\hat{\Sigma}_P^b$ respectively.

Parametric Adaptive Matched Filter

Referring to FIGS. 6 through 11, the functional block diagrams include implicit and explicit amplitude estimation and accommodation of Gaussian and non-Gaussian disturbance described in the several embodiments of the present invention. The practical distinctions between implicit and explicit amplitude estimation lie in their computational complexity. The implicit test statistic is estimated more efficiently than the explicit. However, we may need to know the estimated amplitude in some applications.

We first describe two parameter estimations common to all embodiments. The first step is to select an algorithm to estimate the LPM parameters in filter parameters 107. For the time series AR LPM, the Nuttall-Strand algorithm is a good candidate. This algorithm is applied to secondary data $x(n|H_0)$ 203 from a host system 100. Thus the order P parameter estimates $\hat{A}_{P,k}^H(m)$ and $\hat{B}_{P,k}^H(m)$ for m=1,2,..., P are obtained at each range cell k, for k=1, 2, ..., K, with filter order P chosen either by the user or by a model order selection method (Aiaike, H., "Power Spectrum Estimation through Autoregressive Model Fitting," Ann. Inst. Statist. Math., vol. 21, pp. 407–419, 1969). These estimates are averaged over K range rings to obtain the averaged estimates $\hat{A}_P^H(m)$ and $\hat{B}_P^H(m)$, m=1, 2, ..., P.

To obtain the forward and backward prediction error power parameters, we use one of two methods. In method A, the estimates $\hat{\Sigma}_{P,k}^f$ and $\hat{\Sigma}_{P,k}^b$ are obtained along with the estimates $\hat{A}_{P,k}^H(m)$ and $\hat{B}_{P,k}^H(m)$ for m=1, 2, ..., P at each range cell k, for k=1, 2, ..., K by the Nuttall-Strand algorithm. As with the estimates $\hat{A}_{P,k}^H(m)$ and $\hat{B}_{P,k}^H(m)$, $\hat{\Sigma}_{P,k}^f$ and $\hat{\Sigma}_{P,k}^b$ are averaged over the K range rings to obtain the averaged estimates $\hat{\Sigma}_P^f$ and $\hat{\Sigma}_P^b$.

In method B, we first obtain the temporal forward and backward residual error vectors, $\epsilon_k(n)$ and $\beta_k(n)$ respectively, at time n for the kth secondary data cell using either the tapped delay line prediction error filter, shown in FIG. 4A, with forward coefficients $\hat{A}_P^H(m)$, m=1, 2, ..., P or the lattice prediction error filter, shown in FIG. 5A, with forward and backward coefficients $\hat{A}_P^H(m)$ and $\hat{B}_P^H(m)$ respectively, where m=1, 2, ..., P. Then we compute an estimate of the Pth order forward and backward error covariance matrices for the kth range cell by averaging over N time pulses to obtain $$\hat{\Omega}_{P,k}^f = \frac{1}{N}\sum_{n=1}^{N} \underline{\epsilon}_k(n)\underline{\epsilon}_k^H(n) \quad \text{(time averaging)}$$

and $$\hat{\Omega}_{P,k}^b = \frac{1}{N}\sum_{n=1}^{N} \underline{\beta}_k(n)\underline{\beta}_k^H(n) \quad \text{(time averaging)}$$

Next we average these estimates over the K range cells using $$\hat{\Omega}_P^f = \frac{1}{K}\sum_{k=1}^{K} \hat{\Omega}_{P,k}^f \quad \text{(ensemble averaging)}$$

and $$\hat{\Omega}_P^b = \frac{1}{K}\sum_{k=1}^{K} \hat{\Omega}_{P,k}^b \quad \text{(ensemble averaging)}$$

Preliminary testing has revealed that method B provides a performance result with a constant false alarm rate ("CFAR"). This rate implies that the threshold to set a specified probability of a false alarm is fixed and does not vary as a function of the underlying disturbance correlation.

Subsequently, the respective forward and backward estimated error covariance matrices for either method A, $\hat{\Sigma}_P^f$ and $\hat{\Sigma}_P^b$, or method B, $\hat{\Omega}_P^f$ and $\hat{\Omega}_P^b$, are decomposed using one of Cholesky factorization, LDU decomposition, or SVD. For simplicity, we focus only on the forward estimated error covariance matrix, $\hat{\Sigma}_P^f$, obtained from the tapped delay line based prediction error filter. Using LDU decomposition, we solve the equation $\hat{\Sigma}_P^f = \hat{L}_0 \hat{D}_0 \hat{L}_0^H$ to obtain $\hat{L}_0$ and $\hat{D}_0$ (where the subscript denotes that $H_0$ data was used). $\hat{D}_0$ will hereafter be called a diagonal matrix coefficient 215. The parameters $\hat{A}_P^H(p)$, p=1, 2, ... P, and $\hat{L}_0$ are used in the whitening filter 115 shown in FIG. 4A.

The primary data residual $\Gamma_0(n)$ 223 is obtained by inputting $x(n|H_1)$ primary or test cell data 211 to the whitening filter 115. Thus $\Gamma_0(n)$ is expressed as $$\Gamma_0(n) = \hat{L}_0^{-1}\varepsilon(n) = \hat{L}_0^{-1}\left[x(n) + \sum_{k=1}^{P} \hat{A}(k)x(n-k)\right],$$

where n=1, 2, ... N

The whitening filter must be back-filled to prevent a transient initial response. This back filling requires P time pulses from the sequence of N pulses. Thus N–P pulses are available for further processing.

Figure 4B:
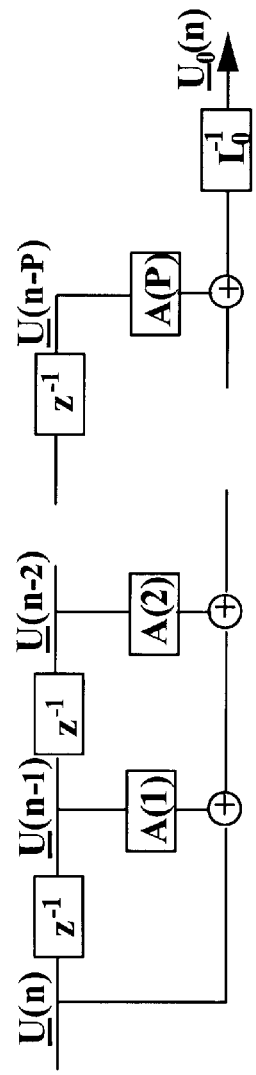
FIG. 4B shows the filter of FIG. 4A rotating a known signal steering vector.

The steering vector residual $U_0(n)$ 219 is computed by inputting the time-sequential form of the steering vector U(n) to the whitening filter 115, as shown in FIG. 4B. Thus $U_0(n)$ is expressed as $$\underline{U}_0(n) = \begin{bmatrix} U_{01}(n) \\ U_{02}(n) \\ \dots \\ U_{0J}(n) \end{bmatrix} = \hat{L}_0^{-1}\left[U(n) + \sum_{k=1}^{P} \hat{A}(k)U(n-k)\right],$$

for $n = 1, 2, ..., N$ where $U(n) = U\exp\{j2\pi(n-1)\overline{\omega}_t\}$, and the spatial steering vector U is defined as $$\underline{U} = \begin{bmatrix} 1 \\ \exp[j2p\theta_t] \\ \exp[j2p2\theta_t] \\ \dots \\ \exp[j2p(J-1)\theta_t] \end{bmatrix}$$

The quantities $\overline{\omega}_t$ and $\theta_t$ are respectively the normalized Doppler and the spatial frequencies of the desired signal.

Varying $\bar{\omega}_t$ and $\theta_t$ through the range between −0.5 and +0.5, enables the angle-Doppler space to be searched for the presence of the signal.

Implicit amplitude estimation assuming Gaussian disturbance

Figure 6:
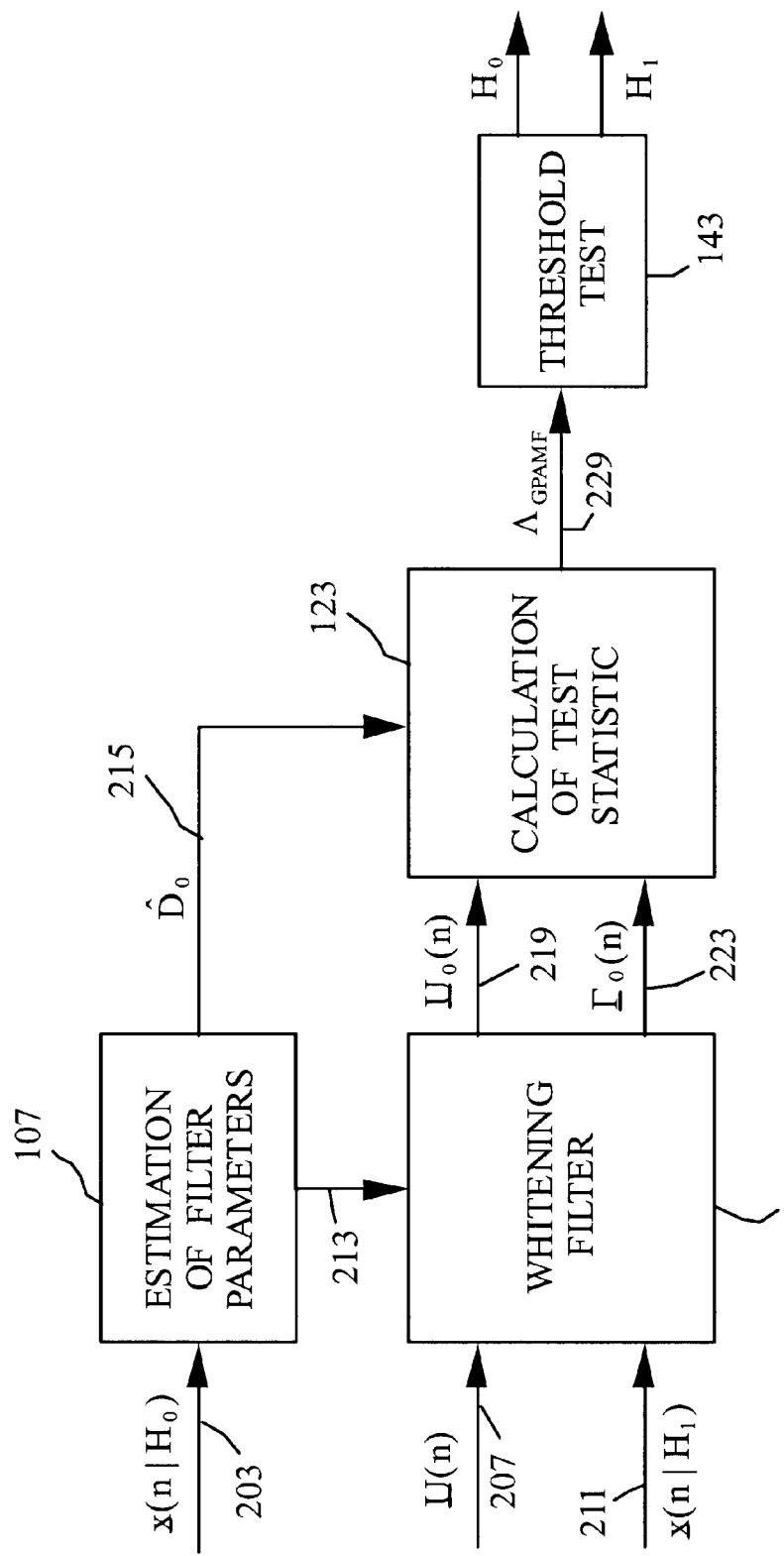
FIG. 6 shows a functional block diagram of the Gaussian parametric adaptive matched filter ("PAMF") process exhibiting implicit amplitude estimation.

Referring to FIG. 6, a functional block diagram of the Gaussian parametric adaptive matched filter ("PAMF") process exhibits implicit amplitude estimation. The Gaussian PAMF test statistic $\Lambda_{GPAMF}$ 229 is calculated in block 123 as $$\Lambda_{GPAMF} = \frac{\left|\sum_{n=1}^{N} \underline{U}_0^H(n)\hat{D}_0^{-1}\Gamma_0(n)\right|^2}{\sum_{n=1}^{N} \underline{U}_0^H(n)\hat{D}_0^{-1}\underline{U}_0(n)}$$

Finally, this statistic is compared to a pre-stored threshold in threshold test 143 to decide the presence ($H_1$) or absence ($H_0$) of a target.

Implicit amplitude estimation assuming non-Gaussian disturbance

Figure 7:
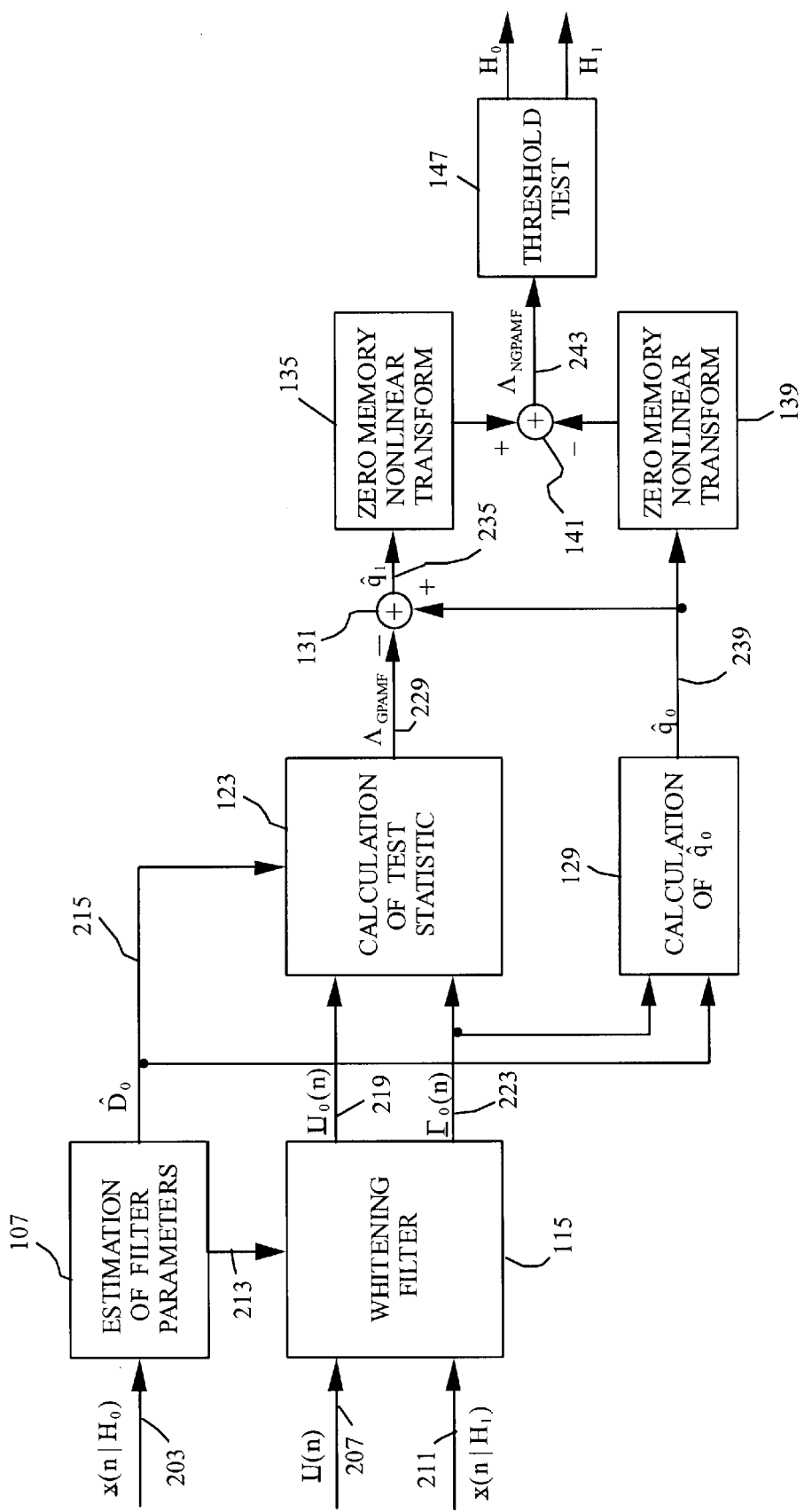
FIG. 7 shows a functional block diagram of the non-Gaussian PAMF process exhibiting implicit amplitude estimation.

Referring to FIG. 7, a functional block diagram of the non-Gaussian PAMF process exhibits implicit amplitude estimation. Compared to the method of FIG. 6, a number of additional steps are required. First is the calculation in block 129 of a quadratic term $\hat{q}_0$ 239 as $$\hat{q}_0 = \sum_{n} \Gamma_0^H(n)\hat{D}_0^{-1}\Gamma_0(n)$$

Next a Gaussian PAMF test statistic $\Lambda_{GPAMF}$ 229 is subtracted from term $\hat{q}_0$ 239 at a summing junction 131 to form a term $\hat{q}_1$ 235. Terms $\hat{q}_1$ 235 and $\hat{q}_0$ 239 are then each transformed by the respective zero memory nonlinear transforms 135 and 139. The functional form of the zero memory nonlinear transforms 135 and 139 is given by $\ln[h_{2JN}(\hat{q}_i)]$. The function $h_{2JN}$ selected for the case of K-distributed clutter is $$h_{2JN}(q_i) = \frac{2b^{2JN}}{\Gamma(\alpha)}\left(b\sqrt{q_i}\right)^{\alpha-JN} K_{\alpha-JN}\left(2b\sqrt{q_i}\right), \text{ for } i = 0, 1$$

where $\Gamma$ is the Gamma function, $\alpha$ and b are respectively the shape and scale parameters, and $K_N(\bullet)$ is the $N^{th}$ order modified Bessel function of the second kind.

The transformed term $\ln[h_{2JN}(\hat{q}_0)]$ is subtracted from transformed term $\ln[h_{2JN}(\hat{q}_1)]$ at summing junction 141 to produce a non-Gaussian PAMF test statistic $\Lambda_{NGPAMF}$ 243 as $$\Lambda_{NGPAMF} = \ln[h_{2JN}(\hat{q}_1)] - \ln[h_{2JN}(\hat{q}_0)]$$

that is subject to a threshold test 147 to determine whether a target is present or absent.

Explicit amplitude estimation with assumed Gaussian disturbance

Figure 8:
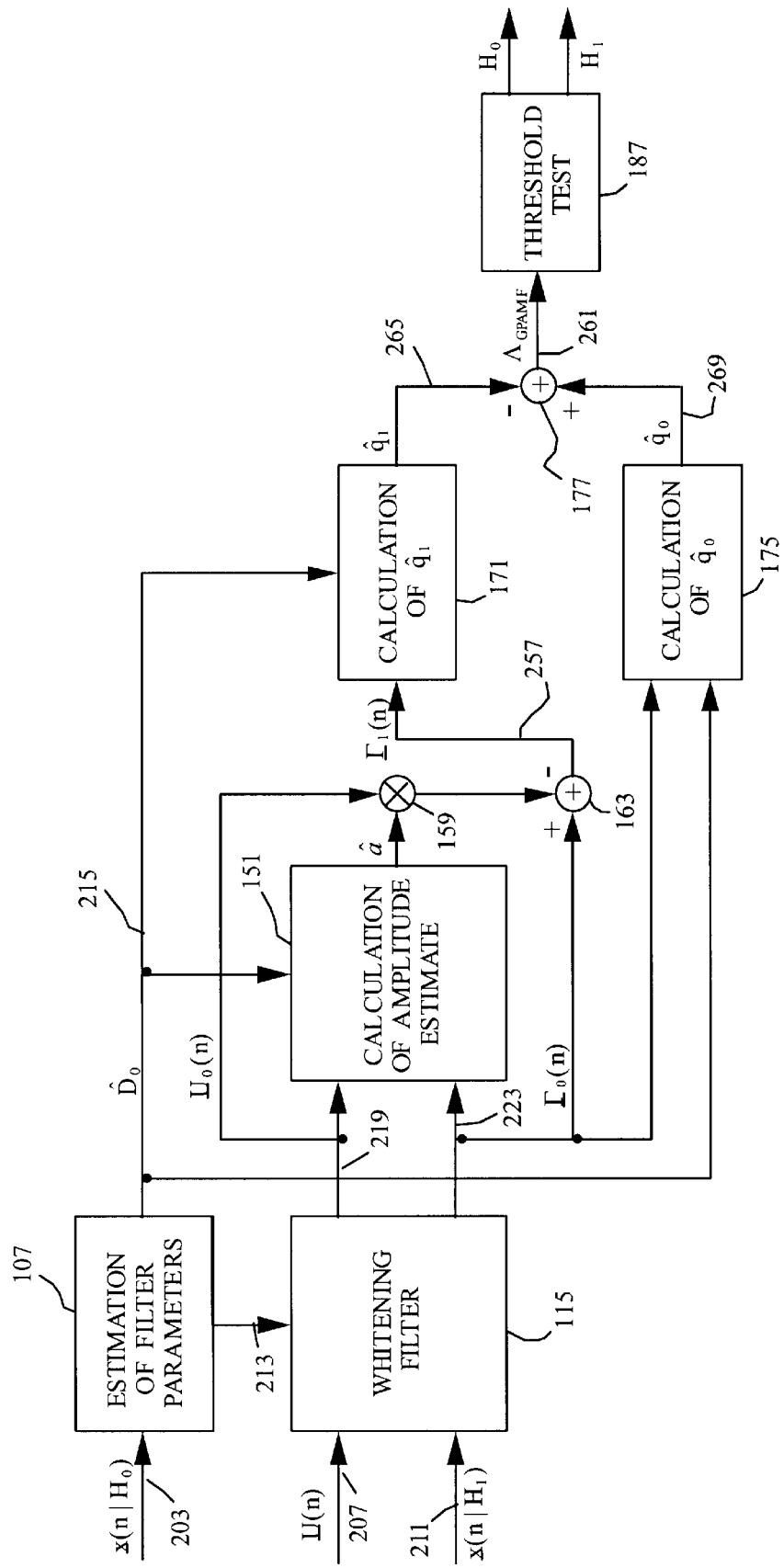
FIG. 8 shows a functional block diagram of the Gaussian PAMF process exhibiting explicit amplitude estimation.

Referring to FIG. 8, a functional diagram of the Gaussian PAMF process exhibits explicit amplitude estimation. Again, compared to FIG. 6, a number of additional processing steps are required. First is a calculation of an amplitude estimate $\hat{\alpha}$ 151:

$$\hat{a} = \frac{\sum_{n=1}^{N} U_0^H(n)\hat{D}_0^{-1}\Gamma_0(n)}{\sum_{n=1}^{N} U_0^H(n)\hat{D}_0^{-1}U_0}.$$

Next we compute the product $\hat{\alpha}U_0(n)$ at a multiplier junction 159. This quantity is subtracted from a primary data residual $\Gamma_0(n)$ 223 at a summing junction 163 to obtain a $\Gamma_1(n)$ 257. The primary data residual $\Gamma_0(n)$ 223 is now used in block 175 to calculate the quadratic $\hat{q}_0$ as $$\hat{q}_0 = \sum_{n=1}^{N} \Gamma_0^H(n)\hat{D}_0^{-1}\Gamma_0(n).$$

The term $\Gamma_1(n)$ 257 is used in block 171 to calculate the quadratic $\hat{q}_1$ as $$\hat{q}_1 = \sum_{n=1}^{N} \Gamma_1^H(n)\hat{D}_0^{-1}\Gamma_1(n).$$

The term $\hat{q}_1$ is now subtracted from $\hat{q}_0$ at a summing junction 177 to form a Gaussian PAMF test statistic $\Lambda_{GPAMF}$ 261.

Explicit amplitude estimation approach with assumed non-Gaussian disturbance

Figure 9:
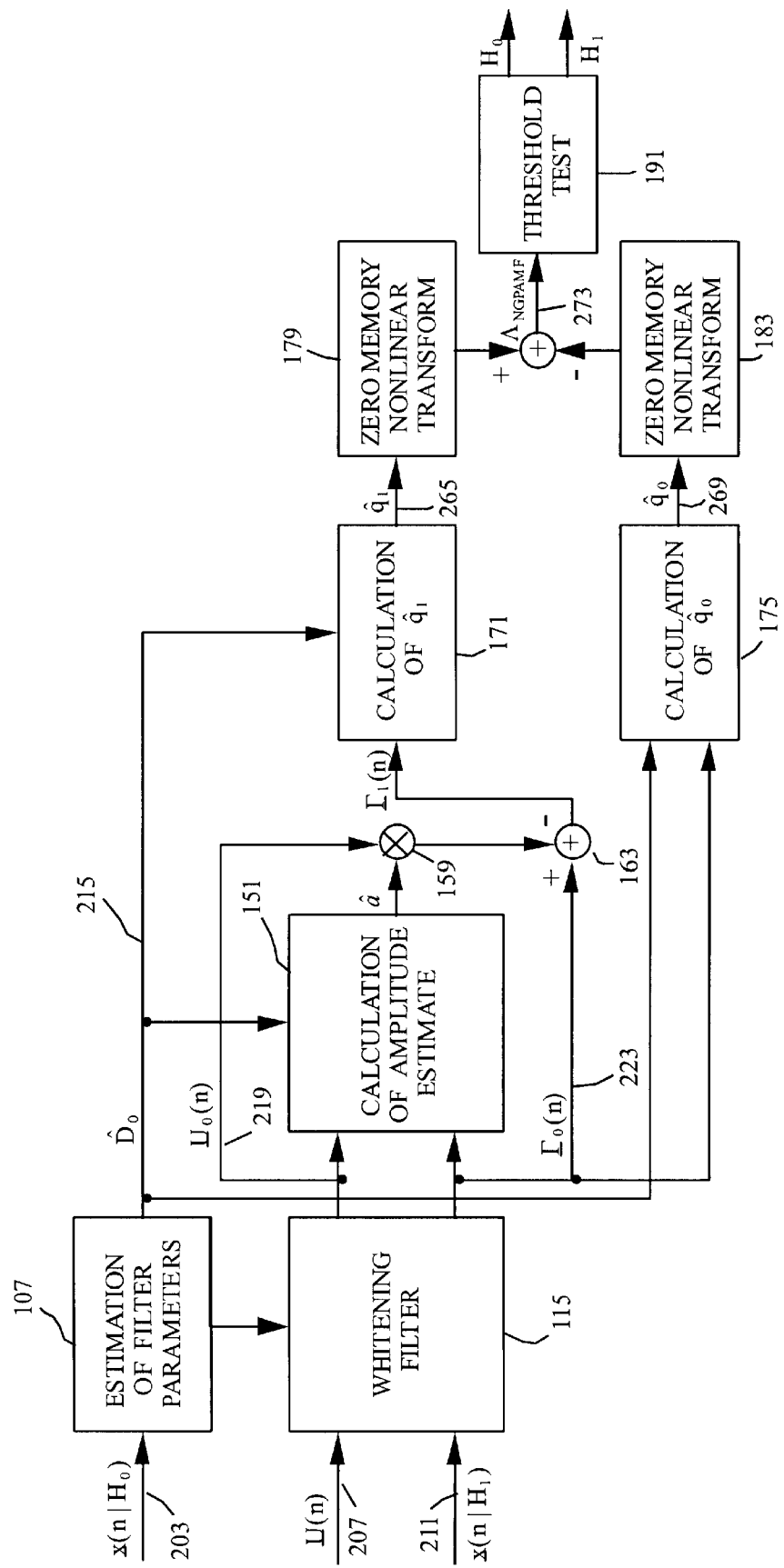
FIG. 9 shows a functional block diagram of the non-Gaussian PAMF process exhibiting explicit amplitude estimation.

Referring to FIG. 9, a functional diagram of the non-Gaussian PAMF process exhibits explicit amplitude estimation. Compared to FIG. 7, a number of additional processing steps are required. First is the calculation of block 151 to obtain the amplitude estimate $$\hat{a} = \frac{\sum_{n=1}^{N} \underline{U}_0^H(n)\hat{D}_0^{-1}\Gamma_0(n)}{\sum_{n=1}^{N} \underline{U}_0^H(n)\hat{D}_0^{-1}\underline{U}_0}.$$

Next we compute the product $\hat{\alpha}U_0(n)$ at multiplier junction 159. This quantity is subtracted from primary data residual $\Gamma_0(n)$ 223 at summing junction 163 to obtain $\Gamma_1(n)$ 257. Primary data residual $\Gamma_0(n)$ 223 is now used in block 175 to calculate a quadratic $\hat{q}_0$ 269 as $$\hat{q}_0 = \sum_{n=1}^{N} \Gamma_0^H(n)\hat{D}_0^{-1}\Gamma_0(n).$$

$\Gamma_1(n)$ 257 is used in block 171 to form a quadratic $\hat{q}_1$ 265 as $$\hat{q}_1 = \sum_{n=1}^{N} \Gamma_1^H(n)\hat{D}_0^{-1}\Gamma_1(n).$$

Terms $\hat{q}_1$ 265 and $\hat{q}_0$ 269 are then each transformed by zero-memory nonlinear transforms 179 and 183 respectively. The functional form of zero-memory nonlinear transforms 179, 183 is $\ln[h_{2JN}(q_i)]$. The function $h_{2JN}$ selected for the case of K-distributed clutter is $$h_{2JN}(\hat{q}_i) = \frac{2b^{2JN}}{\Gamma(\alpha)}(b\sqrt{\hat{q}_i})^{\alpha-JN} K_{\alpha-JN}(2b\sqrt{\hat{q}_i}) \quad i=0,1$$

where $\Gamma$ is the Gamma function, $\alpha$ and b are the shape and scale parameters respectively, and $K_N(\cdot)$ denotes the $N^{th}$ order modified Bessel function of the second kind.

The transformed $\ln[h_{2JN}(\hat{q}_0)]$ is subtracted from $\ln[h_{2JN}(\hat{q}_1)]$ at summing junction 141 to produce a non-Gaussian PAMF test statistic $\Lambda_{NGPAMF}$ 273 as $$\Lambda_{NGPAMF} = \ln h_{2JN}(\hat{q}_1) - \ln h_{2JN}(\hat{q}_0)$$

that is subject to a threshold test 191 to determine whether a target is present or absent.

Figure 10:
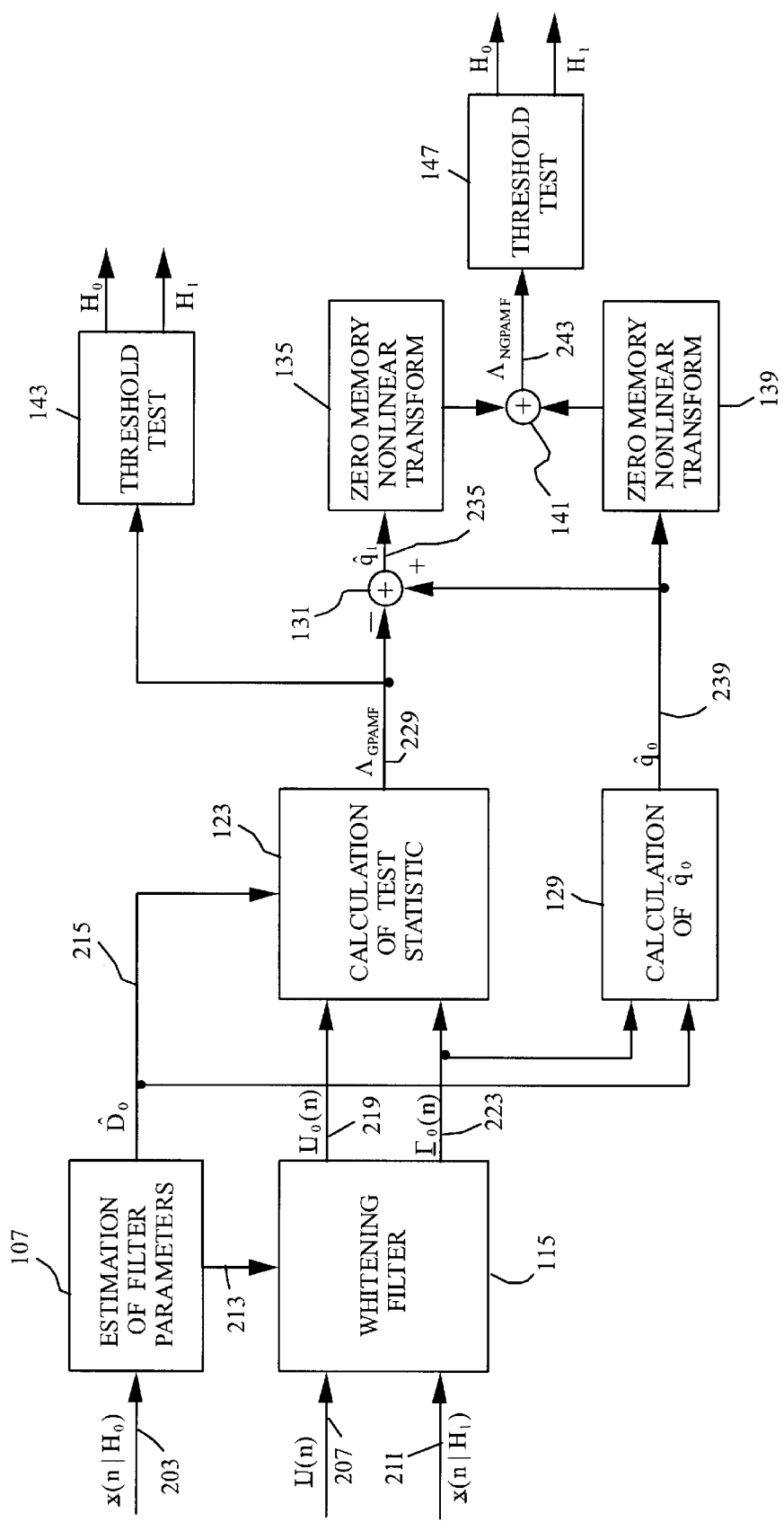
FIG. 10 shows a functional block diagram of the combined Gaussian and non-Gaussian PAMF process for an implicit amplitude estimation architecture.
Figure 11:
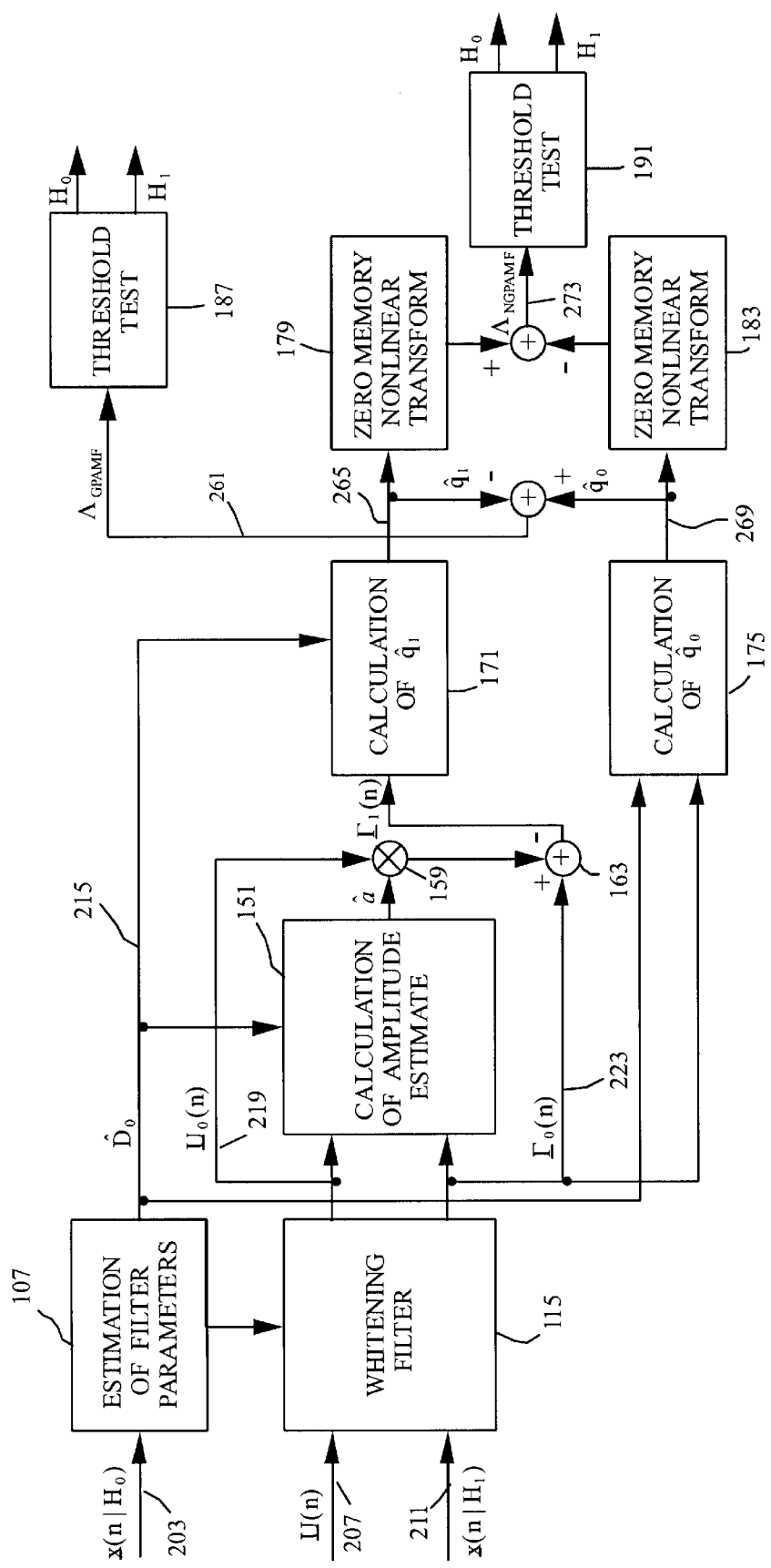
FIG. 11 shows a functional block diagram of the combined Gaussian and non-Gaussian PAMF process for an explicit amplitude estimation architecture.

FIG. 10 is a functional block diagram that shows the combined Gaussian and non-Gaussian PAMF methods with an implicit amplitude estimate. FIG. 11 is the corresponding diagram for an explicit amplitude estimate. Computing both Gaussian and non-Gaussian PAMFs in parallel can be useful for a number of scenarios, including assessing clutter phenomenology or changing clutter statistics.

Figure 12:
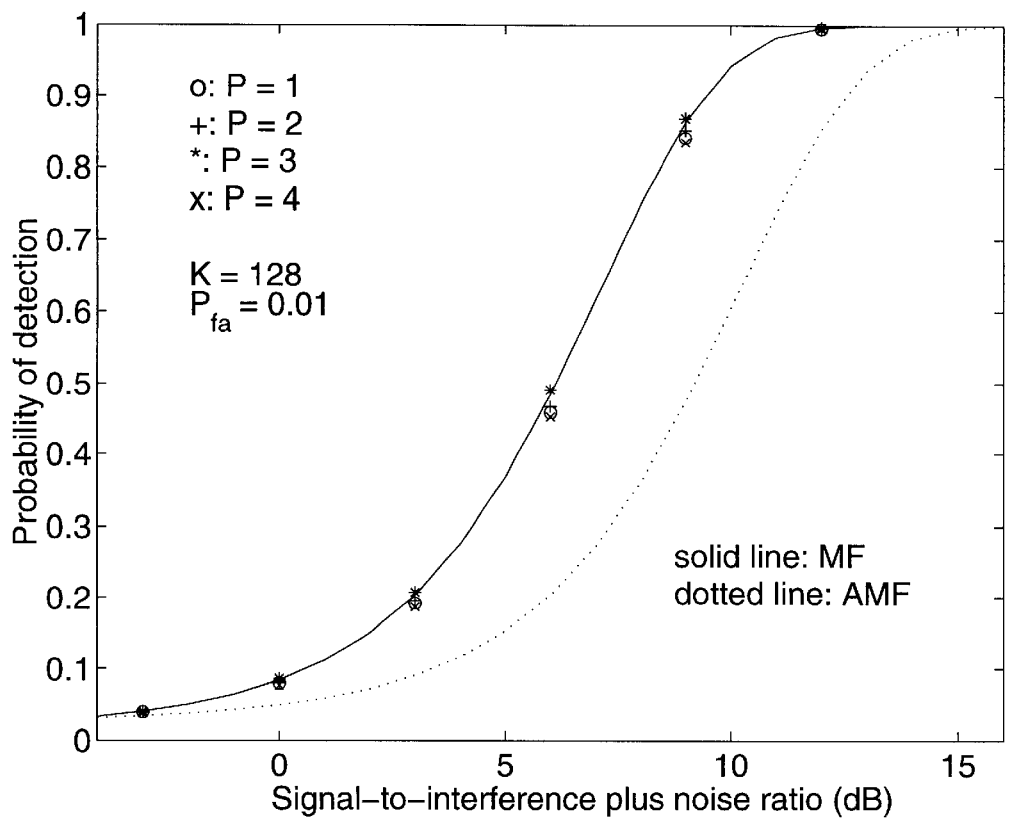
FIG. 12 shows the probability of detection versus output signal-to-interference-plus-noise ratio for J=2 elements (i.e., channels), N=32 pulses, and K=128 secondary range cells in Gaussian clutter plus one white noise barrage jammer plus thermal white noise. The solid curve is the optimal matched filter ("MF"); the dashed curve is the constant false alarm rate adaptive matched filter ("CFAR AMF"); the plotted Monte-Carlo test results are for a PAMF with order P as parameter.

FIG. 12 shows the probability of detection versus signal-to-interference-plus-noise ratio for the Gaussian PAMF with J=2 and N=32 and filter order P as a parameter. The probability of a false alarm was maintained at 0.01. The estimates were obtained for K=2JN=128 range cells. The solid curve is for the matched filter with known disturbance covariance matrix; the dotted curve, for the CFAR Adaptive Matched Filter. The results show that the PAMF achieves nearly optimal performance for orders P=1, 2, 3, 4 and the best performance for P=3.

Figure 13:
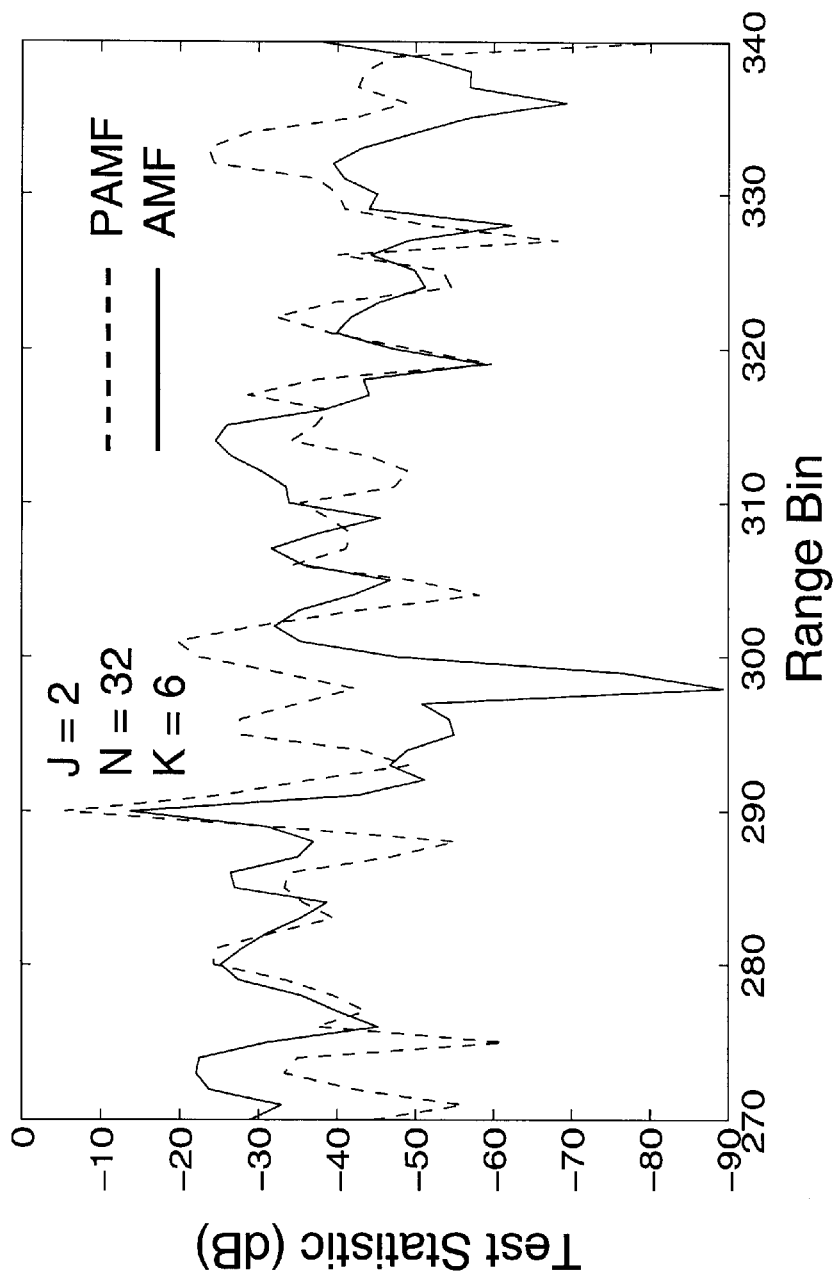
FIG. 13 shows the Gaussian PAMF receiver test statistic and the CFAR AMF test statistic versus radar range for J=2 channels, N=32 pulses, and K=6 secondary data cells for estimating the prediction error filter coefficients.
Figure 14:
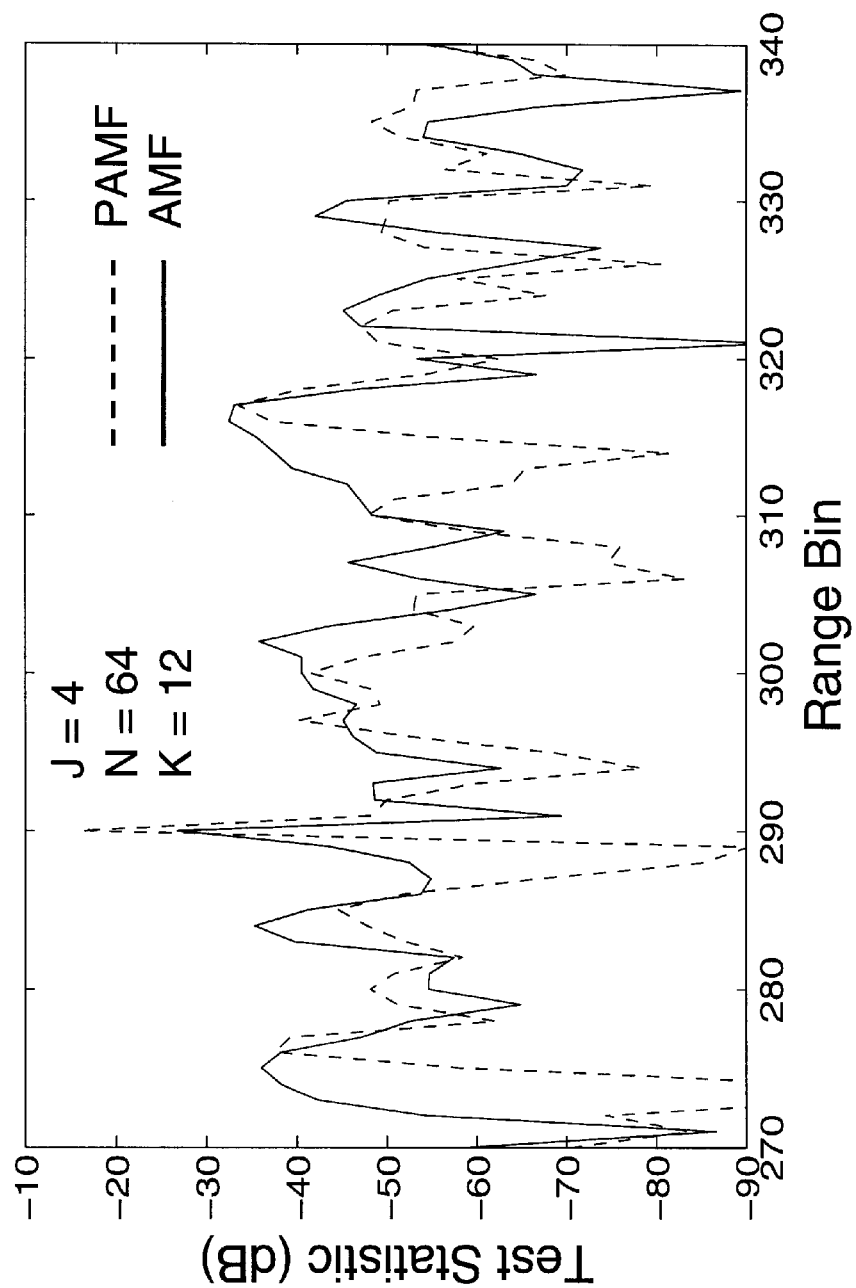
FIG. 14 shows the Gaussian PAMW receiver test statistic and the CFAR AMF test statistic versus radar range for J=4 channels, N=64 pulses, and K=12 secondary data cells for estimating the prediction error filter coefficients.
Figure 15:
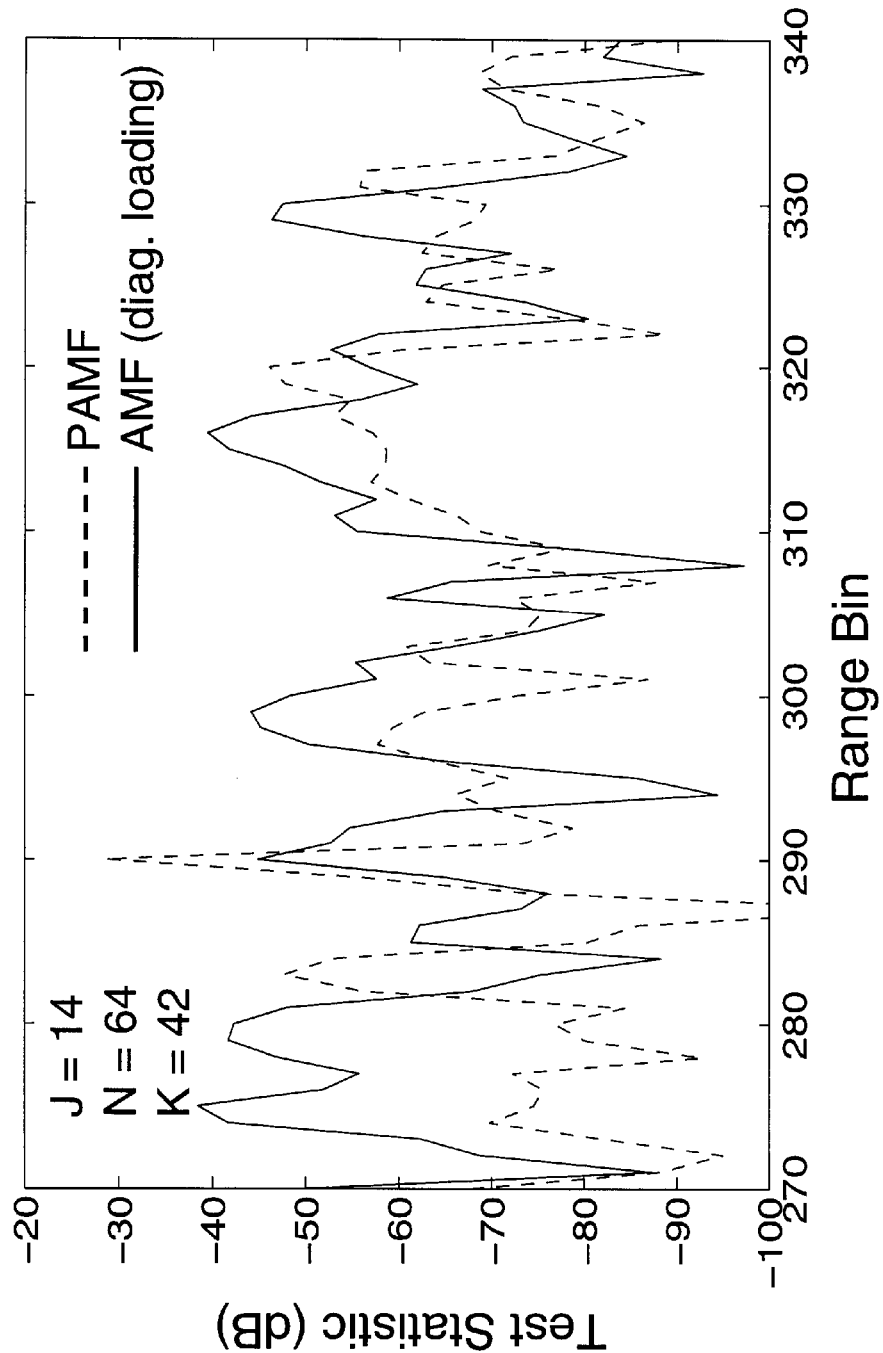
FIG. 15 shows the Gaussian PAMF receiver test statistic and the CFAR AMP test statistic versus radar range for J=14 channels, N=64 pulses, and K=42 secondary data cells for estimating the prediction error filter coefficients.

FIGS. 13–15 show the performance of both the PAMF Gaussian test statistic and the CFAR AMF. They plot the test statistic versus range bin using airborne clutter data collected under the US Air Force Multi-channel Airborne Radar Measurements ("MCARM") program. In this test result, a simulated target signal was inserted at range bin 290 along the boresight angle (i.e., normal to the aircraft fuselage). The Doppler bin has been chosen so that the target competes with very strong mainlobe and sidelobe ground clutter. In all three figures, the test statistic has been computed from only K=3J secondary data. Diagonal loading of −55 dB from the peak diagonal element prevented ill-conditioning of $\hat{R}_d$ in the CFAR AMF.

FIG. 13 shows both test statistics as a function of range for J=2 channels and N=32 pulses. Each detector clearly found the target at range bin 290. However, for the PAMF, the ratio of the test statistic at range bin 290 and the next highest value is 14.18 dB (with order P=3), while the CFAR-AMF shows a ratio of 8.33 dB. Thus an improvement of 5.85 dB is obtained for the PAMF.

FIG. 14 shows the same test statistic as a function of range for J=4 channels and N=64 pulses. Again both detectors show the target clearly at range bin 290. However, for the PAMF, the ratio of the test statistic at range bin 290 and the next highest value is 17.46 dB (with order P=3), while the CFAR-AMF shows a ratio of only 5.74 dB, resulting in an 11.72 dB improvement for the PAMF.

FIG. 15 shows the same test statistic as a function of range for J=14 channels and N=64 pulses. In this case, the CFAR-AMF fails to detect the target at range bin 290, but the PAMF detector locates it very clearly with a gain of 17.62 dB (with P=1). This result shows clearly the efficacy of the PAMF when used with real airborne radar data.

Figure 16:
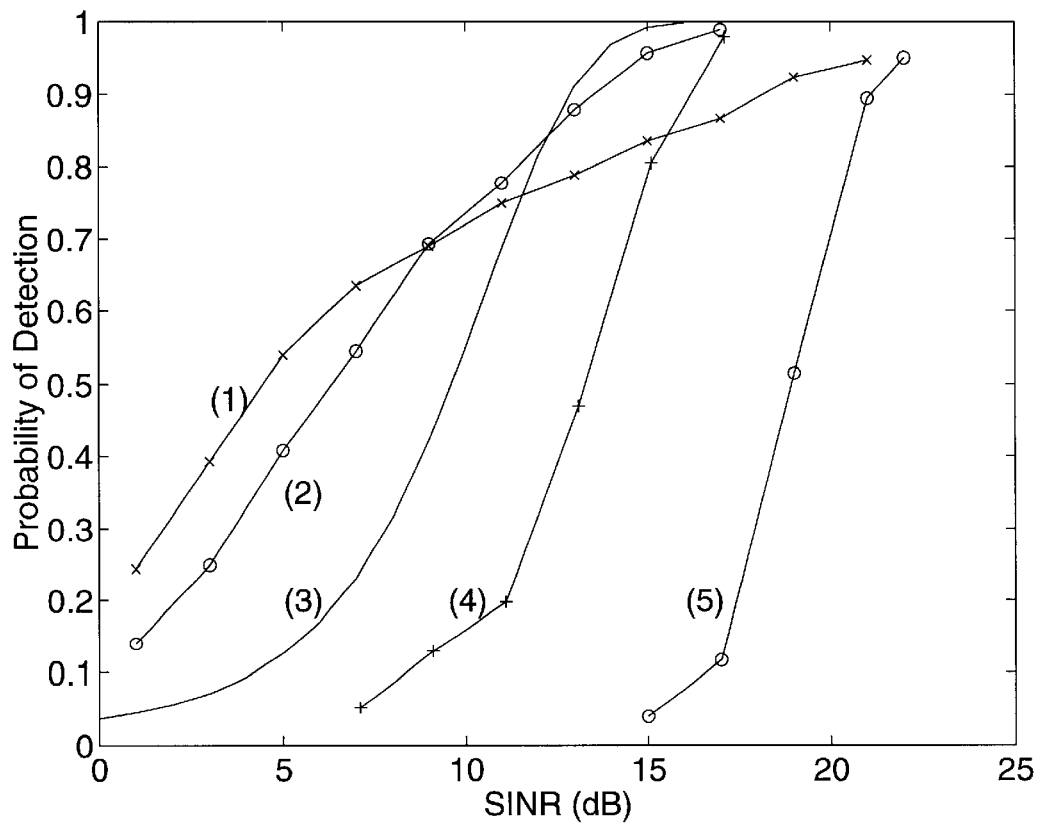
FIG. 16 shows the probability of detection versus output signal-to-interference-plus-noise ratio for J=2 elements (i.e., channels), N=8 pulses, and K=32 secondary range cells in non-Gaussian K-distributed clutter plus thermal white noise. Curves 1 and 2 show the performance of non-Gaussian PAMF processes, designed for K-distributed clutter with shape parameters $\alpha=0.1$ and $\alpha=0.5$, operating in K-distributed clutter ($\alpha=0.1$ and $\alpha=0.5$, respectively) plus thermal white noise. Curves 3, 4, and 5, correspond to the CFAR AMF in K-distributed clutter with shape parameters a $=\infty$ (Gaussian), $\alpha=0.5$, and $\alpha=0.1$ respectively.

FIG. 16 shows the probability of detection versus output signal-to-interference-plus-noise ratio for J=2 channels, N=8 pulses and K=32 secondary range cells in non-Gaussian K-distributed clutter plus thermal white noise. Curves (1) and (2) show the performance of the non-Gaussian PAMF designed for K-distributed clutter with shape parameters $\alpha=0.1$ and $\alpha=0.5$, operating in K-distributed clutter ($\alpha=0.1$ and $\alpha=0.5$ respectively) plus thermal white noise. Curves (3), (4), and (5) correspond to the CFAR AMP in K-distributed clutter with shape parameters $\alpha=\infty$ (Gaussian), $\alpha=0.5$, and $\alpha=0.1$ respectively.

Clearly many modifications and variations of the present invention are possible in light of the above teachings. It should therefore be understood that, within the scope of the inventive concept, the invention may be practiced otherwise than as specifically claimed.

What is claimed is:

1. In a system for processing signals, a method for identifying presence or absence of at least one potential target comprising the steps of:
   receiving from multiple channels signals corrupted by Gaussian or non-Gaussian disturbance;
   partitioning said signals into secondary data having a low probability of containing said potential target and primary data to be assessed for the presence of said target;
   estimating at least one linear filter parameter from said secondary data;
   filtering at least one steering vector and said primary data with at least one whitening filter based on said at least one linear filter parameter to produce at least one steering vector residual and at least one primary data residual;
   calculating a first test statistic as a function of said at least one linear filter parameter, said at least one steering vector residual, and said at least one primary data residual; and
   comparing said first test statistic to a threshold value to provide a "target present" or a "target absent" response when said signals are corrupted by Gaussian disturbance.

2. The method of claim 1, wherein said step of estimating includes estimating a model residual covariance from said secondary data.

3. The method of claim 1, wherein said step of estimating includes estimating a sample residual covariance from said secondary data.

4. The method of claim 1, wherein said step of estimating includes estimating a diagonal matrix coefficient from said secondary data.

5. The method of claim 4, further including the following additional steps, after said step of calculating and before said step of comparing, thereby identifying presence or absence of at least one potential target in signals corrupted by non-Gaussian disturbance:
   calculating a first quadratic term that is a function of said primary data residual and said diagonal matrix coefficient;
   calculating a second quadratic term by subtracting said first quadratic term from said test statistic;
   subjecting both said first and said second quadratic term to a zero-memory nonlinear transform to create respectively a transformed first and a transformed second quadratic term; and
   adding said transformed first and said transformed second quadratic terms to replace said first test statistic in said step of comparing.

6. The method of claim 4, further including the following additional steps to replace said step of comparing, thereby identifying presence or absence of at least one potential target in signals corrupted by either Gaussian or non-Gaussian disturbance:

calculating a first quadratic term as a function of said primary data residual and said diagonal matrix coefficient;

calculating a second quadratic term by subtracting said first quadratic term from said test statistic;

subjecting both said first and said second quadratic term to a zero-memory nonlinear transform to create respectively a transformed first and a transformed second quadratic term;

adding said transformed first and said transformed second quadratic terms to create a second test statistic; and comparing said second test statistic to a threshold value to provide a "target present" or a "target absent" response.

7. In a system for processing signals, a method for identifying presence or absence of at least one potential target comprising the steps of:

receiving from multiple channels signals corrupted by Gaussian or non-Gaussian disturbance;

partitioning said signals into secondary data having a low probability of containing said potential target and primary data to be assessed for the presence of said target;

estimating at least one linear filter parameter from said secondary data;

filtering at least one steering vector and said primary data with at least one whitening filter based on said at least one linear filter parameter to produce at least one steering vector residual and at least one primary data residual;

estimating signal amplitude as a function of said at least one linear filter parameter, said at least one steering vector residual, and said at least one primary data residual, thereby obtaining an estimated signal amplitude;

multiplying said at least one steering vector residual by said estimated signal amplitude to obtain a scaled steering vector residual;

subtracting said scaled steering vector residual from said at least one primary data residual to create an intermediate result;

calculating a first quadratic term as a function of said at least one primary data residual and said at least one linear filter parameter;

calculating a second quadratic term as a function of said intermediate result and said at least one linear filter parameter;

subtracting said second quadratic term from said first quadratic term to form a first test statistic; and comparing said first test statistic to a threshold value to provide a "target present" or a "target absent" response when said signals are corrupted by Gaussian disturbance.

8. The method of claim 7, wherein said step of estimating said at least one linear filter parameter includes estimating a model residual covariance from said secondary data.

9. The method of claim 7, wherein said step of estimating said at least one linear filter parameter includes estimating a sample residual covariance from said secondary data.

10. The method of claim 7, wherein said step of estimating said at least one linear filter parameter includes estimating a diagonal matrix coefficient from said secondary data.

11. The method of claim 10, wherein said steps of calculating said first and said second quadratic terms use said diagonal matrix coefficient as said at least one linear filter parameter.

12. The method of claim 7, further including the following additional steps performed before said step of comparing, thereby identifying presence or absence of at least one potential target in signals corrupted by non-Gaussian disturbance:

subjecting both said first and said second quadratic terms to a zero-memory nonlinear transform to create respectively a transformed first and a transformed second quadratic term; and subtracting said transformed first quadratic term from said transformed second quadratic terms to replace said first test statistic in said step of comparing.

13. The method of claim 7, further including the following additional steps to replace said step of comparing, thereby identifying presence or absence of at least one potential target in signals corrupted by either Gaussian or non-Gaussian disturbance:

subjecting both said first and said second quadratic terms to a zero-memory nonlinear transform to create respectively a transformed first and a transformed second quadratic term;

subtracting said transformed first quadratic term from said transformed second quadratic terms to create a second test statistic; and comparing said second test statistic to a threshold value to provide a "target present" or a "target absent" response.

14. Apparatus for processing signals from which to identify presence or absence of at least one potential target, which comprises:

means for receiving multi-channel signals containing said at least one potential target obscured by Gaussian or non-Gaussian disturbance;

means for partitioning said signals into secondary data having a low probability of containing said potential target and primary data to be assessed for the presence of said potential target;

means for estimating at least one linear filter parameter from said secondary data;

means for filtering at least one steering vector and said primary data with at least one whitening filter based on said at least one linear filter parameter to produce at least one steering vector residual and one primary data residual;

first calculating means for calculating a first test statistic as a function of said at least one linear filter parameter, said steering vector residual, and said primary data residual; and means for comparing being effective for comparing said first test statistic to a threshold value to provide a "target present" or a "target absent" response when said signals are corrupted by Gaussian disturbance.

15. The apparatus of claim 14, wherein said means for estimating includes means for estimating a model residual covariance from said secondary data.

16. The apparatus of claim 14, wherein said means for estimating includes means for estimating a sample residual covariance from said secondary data.

17. The apparatus of claim 14, wherein said means for estimating includes means for estimating a diagonal matrix coefficient from said secondary data.

18. The apparatus of claim 17, wherein said means for calculating uses said diagonal matrix coefficient as said at least one linear filter parameter.

19. The apparatus of claim 18, further comprising:

second calculating means for calculating a first quadratic term as a function of said primary data residual and said diagonal matrix coefficient;

third calculating means for calculating a second quadratic term by subtraction of said first quadratic term from said first test statistic;

means for subjecting both said first and said second quadratic terms to a zero-memory nonlinear transform to create respectively a transformed first and a transformed second quadratic terms;

means for adding said transformed first and second quadratic terms to replace said test statistic; and said means for comparing being effective to identify presence or absence of said at least one potential target in signals corrupted by non-Gaussian disturbance.

20. The apparatus of claim 18, further comprising:

second calculating means for calculating a first quadratic term as a function of said primary data residual and said diagonal matrix coefficient;

third calculating means for calculating a second quadratic term by subtracting said first quadratic term from said test statistic;

means for subjecting both said first and said second quadratic terms to a zero-memory nonlinear transform to create respectively a transformed first and a transformed second quadratic term;

means for adding said transformed first and second quadratic terms to create a second test statistic;

said means for comparing being effective for comparing said second test statistic to a threshold value to provide a "target present" or a "target absent" response when said signals are corrupted by Gaussian or non-Gaussian disturbance.

21. Apparatus for processing signals from which to identify presence or absence of at least one potential target, which comprises:

means for receiving multi-channel signals containing said potential target obscured by Gaussian or non-Gaussian disturbance;

means for partitioning said signals into secondary data having a low probability of containing said potential target and primary data to be assessed for the presence of said potential target;

means for estimating at least one linear filter parameter from said secondary data;

means for filtering at least one steering vector and said primary data with at least one whitening filter based on said at least one linear filter parameter to produce at least one steering vector residual and one primary data residual;

first calculating means for calculating an estimate of signal amplitude as a function of said at least one linear filter parameter, said steering vector residual, and said primary data residual;

means for multiplying said filtered steering vector residual by said estimate of signal amplitude to create a scaled steering vector residual;

first subtracting means for subtracting said scaled steering vector residual from said primary data residual to create an intermediate result;

second calculating means for calculating a first quadratic term as a function of said primary data residual and said at least one linear filter parameter;

third calculating means for calculating a second quadratic term as a function of said intermediate result and said at least one linear filter parameter;

second subtracting means for subtracting said second quadratic term from said first quadratic term to form a first test statistic; and means for comparing said first test statistic to a threshold value to provide a "target present" or a "target absent" response when said signals are corrupted by Gaussian disturbance.

22. The apparatus of claim 21, wherein said means for estimating is effective for estimating a model residual covariance from said secondary data.

23. The apparatus of claim 21, wherein said means for estimating is effective for estimating a sample residual covariance from said secondary data.

24. The apparatus of claim 21, wherein said means for estimating is effective for estimating a diagonal matrix coefficient from said secondary data.

25. The apparatus of claim 24, wherein said at least one linear filter parameter comprises said diagonal matrix coefficient.

26. The apparatus of claim 25, further comprising:

means for subjecting both said first and said second quadratic terms to a zero-memory nonlinear transform to create respectively a transformed first and a transformed second quadratic term;

third subtracting means for subtracting said transformed first quadratic term from said transformed second quadratic terms to create said first test statistic; and said means for comparing being effective to identify presence or absence of said at least one potential target when said signals are corrupted by non-Gaussian disturbance.

27. The apparatus of claim 25, further comprising:

means for subjecting both said first and said second quadratic terms to a zero-memory nonlinear transform to create respectively a transformed first and a transformed second quadratic term;

third subtracting means for subtracting said transformed first quadratic term from said transformed second quadratic term to create a second test statistic; and said means for comparing being effective for comparing said second test statistic to a threshold value to provide a "target present" or a "target absent" response when said signals are corrupted by Gaussian or non-Gaussian disturbance.

* * * * *